(12) United States Patent
Knigge et al.

(10) Patent No.: US 12,176,015 B1
(45) Date of Patent: Dec. 24, 2024

(54) POLE TIP RECESSION COMPENSATION BY DUAL HEATER RATIO OPTIMIZATION IN A HARD DISK DRIVE

(71) Applicant: Western Digital Technologies, Inc., San Jose, CA (US)

(72) Inventors: Bernhard E. Knigge, San Jose, CA (US); Qinghua Zeng, Fremont, CA (US); Noureddine Kermiche, Dana Point, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/490,225

(22) Filed: Oct. 19, 2023

(51) Int. Cl.
*G11B 5/54* (2006.01)
*G11B 5/012* (2006.01)
*G11B 5/60* (2006.01)

(52) U.S. Cl.
CPC .............. *G11B 5/607* (2013.01); *G11B 5/012* (2013.01); *G11B 5/6076* (2013.01)

(58) Field of Classification Search
CPC ... G11B 5/596; G11B 2005/0021; G11B 5/48; G11B 5/56; G11B 33/144; G11B 5/09; G11B 5/455; G11B 5/012; G11B 5/59661; G11B 5/59666; G11B 13/08; G11B 5/4826; G11B 5/58; G11B 20/20; G11B 5/5536
See application file for complete search history.

(56) References Cited

U.S. PATENT DOCUMENTS

| | | | |
|---|---|---|---|
| 8,310,902 B1 | 11/2012 | Contreras et al. | |
| 8,638,349 B1 * | 1/2014 | Liu ...................... | G11B 5/6076 360/75 |
| 9,019,646 B2 | 4/2015 | Rausch et al. | |
| 9,916,851 B1 | 3/2018 | Seigler et al. | |
| 10,192,578 B1 | 1/2019 | Macken et al. | |
| 10,540,998 B2 | 1/2020 | Tatah et al. | |
| 10,580,446 B1 | 3/2020 | Wessel | |
| 2013/0170331 A1 | 10/2013 | Contreras et al. | |
| 2014/0301173 A1 | 10/2014 | Kuehlwein | |

OTHER PUBLICATIONS

Yin, et al. Heat Source Analysis of Hard Disk Drives with Different Wall Conditions using Infrared System, Engineering, 2011, 3, 22-31. 11 pages.

* cited by examiner

*Primary Examiner* — Nabil Z Hindi
(74) *Attorney, Agent, or Firm* — Neugeboren O'Dowd PC

(57) ABSTRACT

A data storage device comprises a disk and a head having a read and write elements. A read heater is powered based on a dual heater ratio (DHR) to thermally adjust a spacing of the read element from a disk surface, and a write heater is powered based on the DHR to thermally adjust a spacing of the write element from the disk surface. A read spacing slope profile is determined comprising read touchdowns (TDs) over a range of DHRs, and a write spacing slope profile is determined comprising write TDs over the range of DHRs. An operating DHR of the head is set to be where the read spacing slope profile intersects the write spacing slope profile.

24 Claims, 16 Drawing Sheets

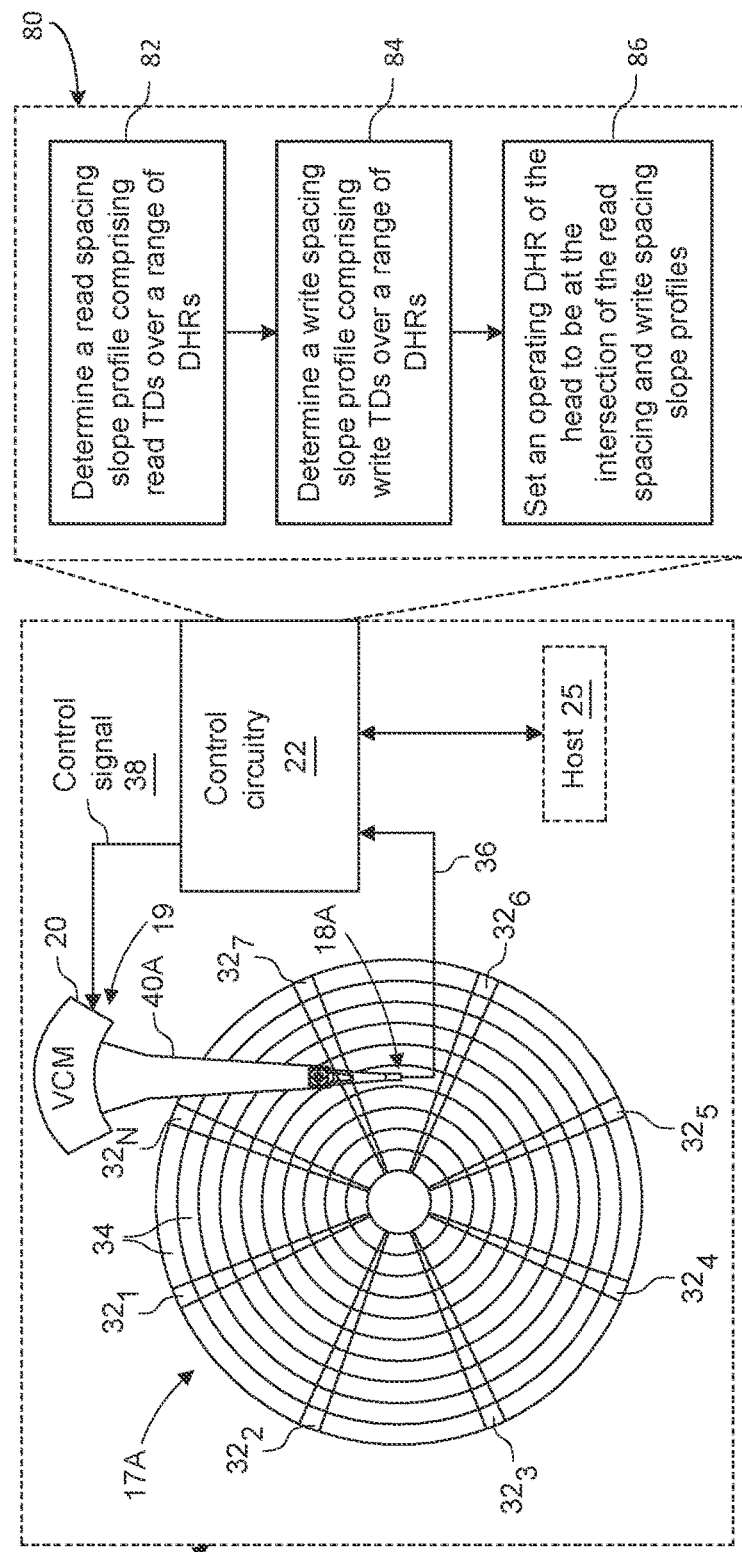
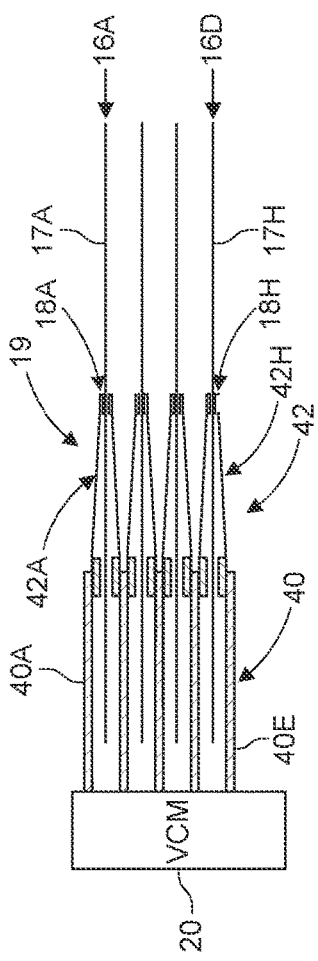
FIG. 2A
FIG. 2B
FIG. 2C

POLE TIP RECESSION COMPENSATION BY DUAL HEATER RATIO OPTIMIZATION IN A HARD DISK DRIVE

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks at carefully controlled fly heights over the disk surfaces. The disk surfaces comprise a plurality of radially spaced, concentric tracks for recording user data sectors and servo wedges or sectors. The servo tracks are written on previously blank disk drive surfaces as part of the final stage of preparation of the disk drive. The servo sectors comprise head positioning information (e.g., a track address) that is read by the heads and processed by a servo control system to control the actuator arms as they seek from track to track.

FIG. 1 is a conceptual diagram of a conventional disk format 2 comprising a number of radially-spaced, concentric servo tracks 4 defined by servo wedges $6_0 \ldots 6_N$ recorded around the circumference of each servo track 4. A plurality of concentric data tracks are defined relative to servo tracks 4 and may have the same or a different radial density (e.g., tracks per inch) than servo tracks 6. Each servo wedge (e.g., servo wedge 64) comprises a preamble 8 for storing a periodic pattern that allows for proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge further comprises groups of phase-based servo bursts 14 (e.g., N and Q servo bursts) that are recorded with a predetermined phase relative to one another and relative to the servo track centerlines.

The coarse head positioning information is processed to position a head over a target data track during a seek operation, and servo bursts 14 provide fine head positioning information used for centerline tracking while accessing a data track during read and write operations. A position error signal (PES) generated by reading servo bursts 14 represents a measured position of the head relative to a centerline of a target servo track. A servo controller processes the PES to generate a control signal applied to an actuator to actuate the head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Fly height, which is the distance between a read/write head and a disk surface in a hard disk drive (HDD), greatly affects HDD performance. Variations in head topography, such as pole tip recession (PTR), variations in temperature, and other inconsistencies can lead to head-to-head variations in the spacing of components of the head from the disk surface. Recently, near-field transducers (NFTs) and laser diodes have been incorporated into read/write heads to facilitate heat-assisted magnetic recording (HAMR). According to aspects of this disclosure, a read spacing sensor is configured near the read element of the head to measure read spacing, and a write spacing sensor is configured near the write element of the head to measure write spacing. In one implementation, the read spacing sensor is an embedded contact sensor (ECS) and the write spacing sensor is a near-field temperature sensor (NTS). The NTS allows for measurement of write spacing without writer touchdown (TD), which may cause burnishing of writer components.

Dual and individually controllable thermal heaters may be configured near the read and write elements of the head to adjust spacing of the read and write elements from the disk surface by thermally expanding the head. According to aspects of this disclosure, this ability to selectively control thermal expansion of the read and write portions of the head is leveraged to neutralize topography variations that inherently occur on a head-to-head basis and that are the source of substantial aerial achievable density loss (ACC loss). In particular, the dual heater ratio (DHR) is customized on a head-by-head basis to minimize spacing difference or loss between the read and write elements at read and write TD. By optimizing the DHR for each head in a group of heads in this manner, consistent read/write spacing at TD from head-to-head can be obtained, and ACC loss is minimized.

Some aspects of this disclosure are directed to a data storage device comprising a disk and a head having read and write elements. A read heater is powered based on a DHR to thermally adjust a read spacing of the read element from a disk surface, and a write heater is powered based on the DHR to thermally adjust a write spacing of the write element from the disk surface. One or more processing devices determine a read spacing slope profile comprising read TDs over a range of DHRs, determine a write spacing slope profile comprising write TDs over the range of DHRs, and set an operating DHR of the head to be where the read spacing slope profile intersects the write spacing slope profile.

In some implementations, a read spacing sensor detects the read TDs and a write spacing sensor detects the write TDs. In some examples, the read spacing sensor is an ECS and the write spacing sensor is an NTS.

In some implementations, the one or more processing devices determine a first heater power required for the read TDs over the range of DHRs, determine a second heater power required for the write TDs over the range of DHRs, and set the operating DHR of the head to be where the first heater power equals the second heater power.

In some implementations, the one or more processing devices concurrently determine the read spacing slope profile and the write spacing slope profile.

In some implementations, the one or more processing devices set the operating DHR of the head as a function of drive temperature.

In some implementations, the one or more processing devices detect the read TDs and the write TDs without physical contact of the head with the disk surface. In some examples, the read TDs and the write TDs are detected during TD backoff (TDBO).

In some implementations, the one or more processing devices determine the write spacing slope profile and the read spacing slope profile over a subset of the range of DHRs.

In some implementations the head is a first head, the data storage device further comprises a second head, and the one or more processing devices are further configured to set an operating DHR for the second head.

In some implementations, the disk comprises a plurality of zones and the one or more processing devices are further configured to set an operating DHR for the head in a first zone and to set an operating DHR for the head in a second zone.

Other aspects of this disclosure are directed to a method for compensating for topography variations in a head comprising a read heater powered based on a DHR to thermally adjust a read spacing of a read element from a disk surface, and a write heater powered based on the DHR to thermally adjust a write spacing of a write element from the disk surface. The method comprises determining a read spacing slope profile comprising read TDs over a range of DHRs, determining a write spacing slope profile comprising write TDs over the range of DHRs, and setting an operating DHR of the head to be where the read spacing slope profile intersects the write spacing slope profile.

Further aspects of this disclosure are directed to one or more processing devices for controlling a head of a data storage device that comprises a read heater powered based on a DHR to thermally adjust a read spacing of a read element from a disk surface, and a write heater powered based on the DHR to thermally adjust a write spacing of a write element from the disk surface. The one or more processing devices determine a first heater power required for read TDs over a range of DHRs, determine a second heater power required for write TDs over the range of DHRs, and set the operating DHR of the head to be where the first heater power equals the second heater power.

Various additional aspects of this disclosure are described below and depicted in the accompanying drawings and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout different views. The drawings depict only illustrative examples of this disclosure and are not limiting in scope.

FIG. 2A is a conceptual block diagram of a top view of a data storage device in the form of a disk drive, in accordance with aspects of this disclosure.

FIG. 2B is a conceptual block diagram of a side view of a data storage device in the form of a disk drive, in accordance with aspects of this disclosure.

FIG. 2C is a flow diagram of a method that a data storage device may perform, execute, and implement, in accordance with aspects of this disclosure.

DETAILED DESCRIPTION

Figure 1:
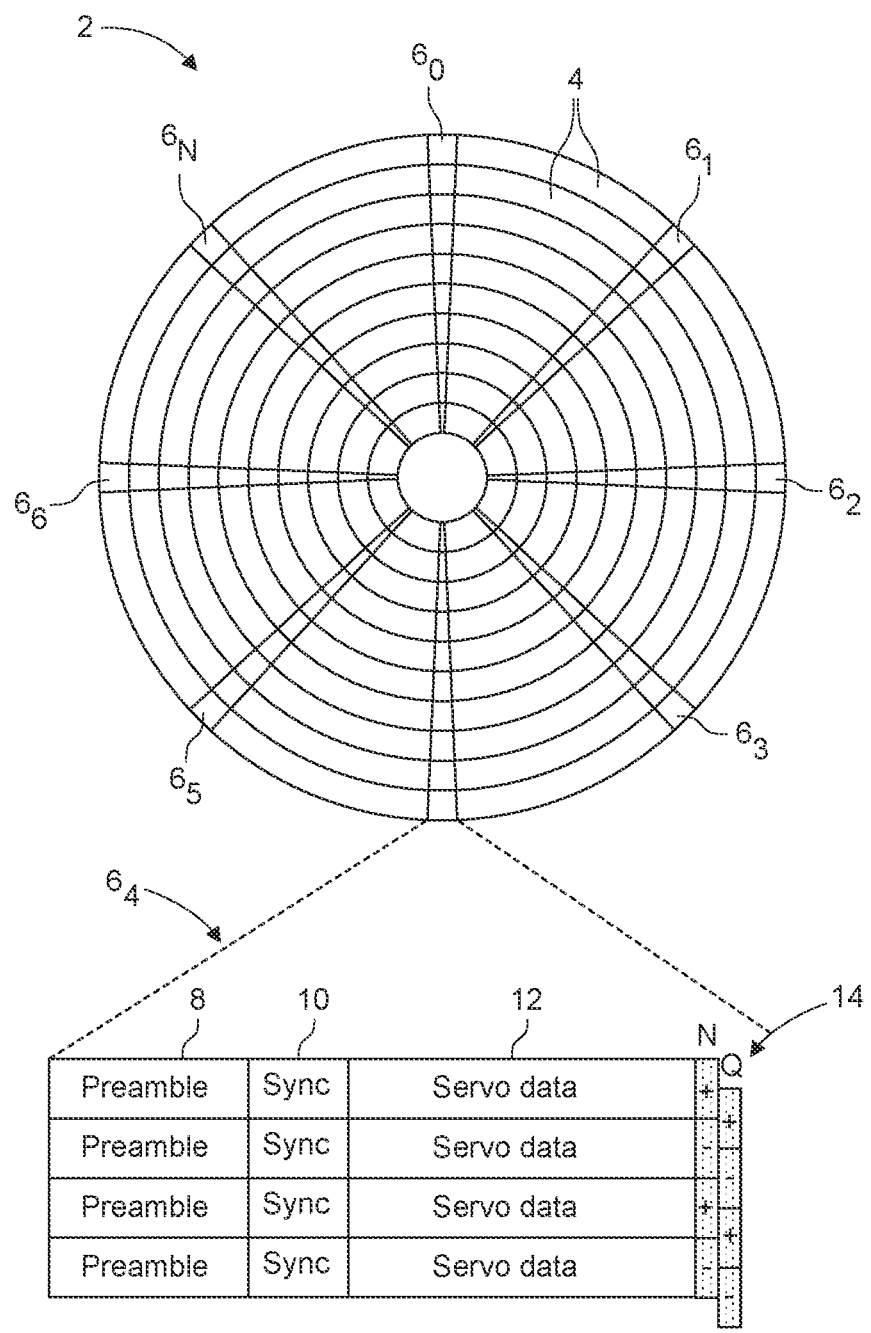
FIG. 1 is a conceptual diagram of a conventional disk format, in accordance with aspects of this disclosure.

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit this disclosure to the precise form disclosed, nor are they exhaustive. Rather, various embodiments are presented to provide a description for utilization by others skilled in the art.

Technology continues to develop, and elements of the disclosed embodiments may be replaced by improved and enhanced items. This disclosure inherently discloses elements incorporating technology available at the time of this disclosure.

The fly height of a read/write head, which is the spacing between the head and a disk surface, is of great importance to the performance of a hard disk drive (HDD). The performance of the head increases as the spacing between the head and the disk surface decreases. Read/write heads are subject to significant variations in head topography, such as pole tip recession (PTR) variations, which lead to large variations in read and write spacing from head-to-head. In addition, variations in head temperature can cause substantial variations in writer spacing (the isothermal protrusion effect). While read spacing can be measured by a read spacing sensor such as an embedded contact sensor (ECS) or by readback signal amplitude (Wallace spacing), write spacing measurements have generally required writer touchdown (TD) which can result in burnishing of sensitive writer elements.

Recently, near-field transducers (NFTs) have been incorporated into read/write heads configured for heat-assisted magnetic recording (HAMR). An NFT, in combination with a laser diode, generates localized heat energy that heats an area of the disk near the write element, enabling data to be written at a higher density to that temporarily heated area. According to this disclosure, a write spacing sensor such as a near field temperature sensor (NTS) is configured in the write portion to measure write spacing. Thus, according to this disclosure, writer spacing sensitivity can be measured without writer TD.

Thermal heaters may be incorporated into the head to thermally expand portions of the head and thereby decrease the spacing between the head and the disk surface. Dual heaters, including a read heater near a read portion of the head and a write heater near the write portion of the head, enable separate adjustments in spacing of the read and write portions of the head from the disk surface. The dual heaters are applied or powered in a certain ratio, known as a dual heater ratio (DHR), to achieve better spacing between the write and read portions and the disk surface. According to aspects of this disclosure, this ability to selectively control thermal expansion of the read and write portions of the head is leveraged to neutralize topography variations that inherently occur on a head-to-head basis and that are the source of substantial aerial achievable density loss (ACC loss). In particular, the operating DHR of the head is customized on a head-by-head basis to minimize spacing difference or loss between the read and write elements at read and write TD. By optimizing the operating DHR for each head in a group of heads in this manner, consistent read/write spacing at TD from head-to-head can be obtained, and ACC loss minimized.

FIGS. 2A and 2B are conceptual top and side views of a data storage device in the form of hard disk drive (HDD) 15, in accordance with aspects of this disclosure. HDD 15 comprises control circuitry 22, actuator assembly 19, and a plurality of hard disks 16 (e.g., disks 16A . . . 16D). FIG. 2C is a flow diagram of a method 80 that control circuitry 22 of HDD 15 performs or executes in controlling the operations of HDD 15, including the operations of read/write heads 18 (e.g., heads 18A . . . 18H) disposed on actuator assembly 19. In particular, method 80 compensates for topography variations in a head comprising a read heater powered based on a dual heater ratio (DHR) to thermally adjust a read spacing of a read element from a disk surface, and a write heater powered based on the DHR to thermally adjust a write spacing of a write element from the disk surface. Method 80 comprises step 82, in which a read spacing slope profile comprising read TDs over a range of DHRs is determined; step 84, in which a write spacing slope profile comprising write TDs over the range of DHRs is determined; and step 86, in which an operating DHR of the head is set to be where the read spacing slope profile intersects the write spacing slope profile.

Actuator assembly 19 is configured to position heads 18 over surfaces 17 (e.g., surfaces 17A . . . 17H) of disks 16. Heads 18 comprise write and read elements configured for writing and reading control features and data to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured at a distal end of an actuator arm 40 via a suspension 42 (suspensions 42A . . . 42H). Each actuator arm 40 is configured to suspend a head 18 in close proximity over a corresponding disk surface 17. For example, head 18A is suspended by topmost actuator arm 40A via suspension 42*a* over topmost disk surface 17A, and head 18H is suspended by lowest actuator arm 40H via suspension 42H over lowest disk surface 17H. FIGS. 2A-B are presented for exemplary purposes only; a wide variety of other numbers of disks, disk surfaces, primary actuators, actuator assemblies, suspensions, and heads are contemplated and may be used.

FIG. 2A also depicts servo sectors 32 (e.g., servo sectors 321 . . . 32N) written onto disk surfaces 17 (e.g., disk surface 17A) to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (an alternating pattern of magnetic transitions) that the servo system of HDD 15 samples to align a head 18 with and relative to a particular track 34. Servo sectors 32 are spaced sequentially around the circumferences of tracks 34 and extend radially outward from the inner diameter of disk surfaces 17. Data is conventionally written in data regions in a plurality of discrete data sectors. Each data region is typically preceded by a servo sector 32.

Control circuitry 22 processes read signals 36 emanating from heads 18 (e.g., head 18A) to demodulate servo data written on the disk (e.g., servo sectors 32) to generate a position error signal (PES) representing an error between the actual position of the head and a target position relative to a target track. Control circuitry 22 processes the PES using a suitable servo control system to generate VCM control signal 38 that is applied to VCM 20, which rotates actuator arm 40 about a pivot to actuate head 18 radially over disk surface 17 in a direction that reduces the PES. In some examples, HDD 15 may also comprise a suitable micro actuator, such as a piezoelectric (PZT) element, for actuating head 18 relative to a suspension 42, or for actuating a suspension 42 relative to actuator arm 40. Host 25 may be a computing device such as a desktop computer, laptop, server, mobile computing device (e.g., smartphone, tablet, etc.), or any other suitable computing device. Alternatively, host 25 may be a test computer that performs calibration and testing functions as part of the HDD manufacturing process.

Each head 18 is conventionally embedded in the trailing edge of a component known as a slider. The slider in turn is affixed to a suspension, which is found at the terminating end of actuator arm 40. As disk 16 spins at a high speed, the slider is lifted, or 'flies', above disk 16. It hovers on a thin layer of air, maintaining a stable distance measured in nanometers from disk surface 17. This minuscule distance permits heads 18 to retrieve or store data while avoiding direct physical contact with disk surface 17, thereby preventing data corruption and potential damage to disk surface 17.

Figure 3A:
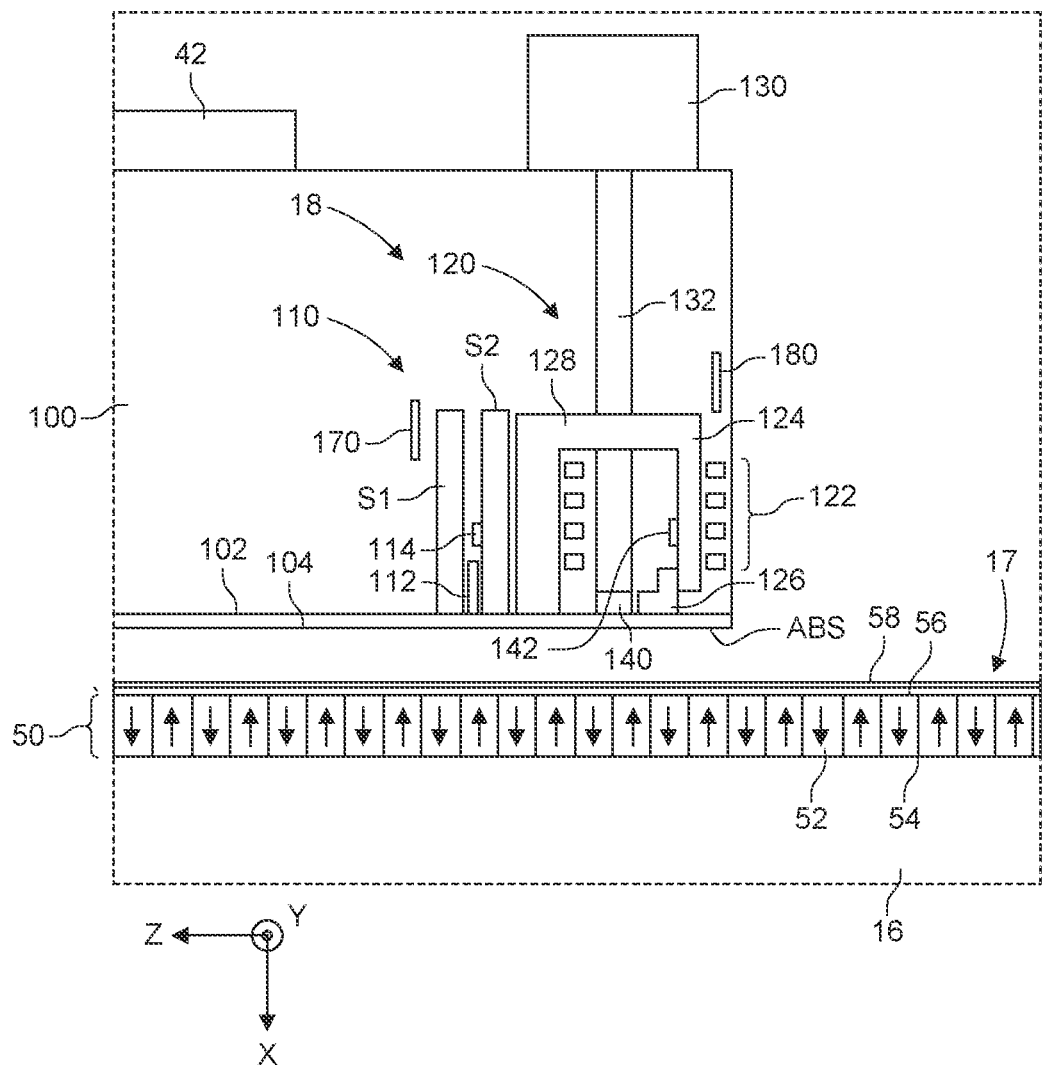
FIG. 3A is a conceptual sectional diagram of a slider hovering over a disk surface, in accordance with aspects of this disclosure.

FIG. 3A is a conceptual sectional diagram of a slider 100 supported by a suspension 42 and hovering over surface 17 of disk 16, according to aspects of this disclosure. The components of head 18 are integrated into the trailing edge of slider 100. As disk 16 rotates, movement of actuator arm 40 allows head 18 to access different data tracks on disk 16. In some implementations, slider 100 is configured for HAMR. It should be understood that slider 100 of FIG. 3A, including its illustrated read and write components, is presented for exemplary purposes only and is merely one example of how a slider might be configured. Slider 100 could be configured in many other ways and still implement the principles of this disclosure. Moreover, while only one disk surface 17 with an associated slider 100 and head 18 is shown in FIG. 3A, there are typically multiple disks 16 stacked on a hub and rotated by a spindle motor (as shown in FIG. 2B, for example), with a separate slider and head associated with each disk surface.

In FIG. 3A, the X direction denotes a direction perpendicular to the air bearing surface (ABS) of the slider, the Y direction denotes a track width or cross-track direction, and the Z direction denotes an along-track or on-track direction. Disk 16 is a conventional disk with recording layer 50 being a continuous non-patterned magnetic recording layer with magnetized regions or bits 52. Bits 52 are physically adjacent to each other with magnetic transitions 54 therebetween. Recording layer 50 may be formed, for example, of a high-anisotropy (Ku) substantially chemically-ordered FePt (or CoPt) alloy with perpendicular magnetic anisotropy. Disk surface 17 may include overcoat 56, typically formed of amorphous diamond-like carbon (DLC) and liquid lubricant layer 58, typically a bonded perfluoropolyether (PFPE).

Overcoat 104, which is deposited onto recording layer-facing surface 102 of slider 100, is typically a DLC overcoat whose outer surface forms the ABS of slider 100. Head 18 is integrated on the trailing edge of slider 100 and comprises read portion 110 and write portion 120. Read portion 110 comprises magneto resistive (MR) head or pole 112 positioned between shields S1 and S2 that senses the magnetic orientation of bits 52 in recording layer 50, which corresponds to stored data. In particular, the magnetic field from each bit 52 influences the resistance of read head 112. This change in resistance of read head 112 is measured by control circuitry 22 and interpreted as a '0' or '1', thereby reading the stored data. Shields S1 and S2 confine the sensed magnetic field to the bit being read and prevent interference from neighboring bits.

In some implementations, a read spacing sensor 114 is configured near read head 112 to precisely measure the spacing between read head 112 and disk surface 17. In one non-limiting example, read spacing sensor 114 is an embedded contact sensor (ECS). ECS 114 operates based on the principle of thermal proximity sensing. It may include, for example, a small resistive element whose electrical resistance changes with temperature. ECS 114 is sensitive to thermal dissipation that occurs due to air and/or near-contact friction between read head 112 and disk surface 17 when they come close to each other. As read head 112 gets closer to disk surface 17, the amount of heat transferred to ECS 114 from disk surface 17 increases, causing the temperature of ECS 114 to rise. This change in temperature results in a change in the resistance of ECS 114, which can be measured and used to estimate the spacing between read head 112 and disk surface 17. The exact placement and configuration of read spacing sensor 114 within read portion 110 may vary; the placement and configuration shown in FIG. 3A is merely one non-limiting example. In addition, while an ECS is one example of a read spacing sensor 114, other types of read spacing sensors may be used.

In some implementations, a Wallace spacing read back signal may be used as an alternative to read spacing sensor 114 for spacing control of read head 112. Wallace spacing refers to a phenomenon where the read back signal cannot increase and flattens out as the head touches down on the reader. In essence, the signal strength flattens as the distance from the head to the disk surface decreases. This can be used to infer head-disk spacing based on the strength of the read-back signal. While Wallace spacing loss might be used as an alternative to read spacing sensor 114, it has a drawback in that the drive must be reading data, whereas a read spacing sensor such as an ECS can operate regardless of whether the drive is reading or writing data.

Write portion 120 generates a recording magnetic field and comprises coil 122, main magnetic pole 124 for transmitting flux generated by coil 122, write pole 126, and return pole 128. Coil 122 generates a magnetic field when an electrical current containing data as a current pattern is sent to it. The strength and direction of the magnetic field generated by coil 122 depends on the current passing through it. Main magnetic pole 124 concentrates and directs the magnetic field generated by coil 122 and write pole 126 directs the magnetic field onto a very small area of the disk that corresponds to the bit 52 being written. The field from write pole 126 sets the magnetic orientation of bit 52, effectively writing a '1' or a '0' depending on the direction of the field. Return pole 128 provides a path for the magnetic flux to return from write pole 126 to coil 122.

Semiconductor laser 130 is the HAMR light source and may be configured on top of slider 100 as shown in FIG. 3A or may be located elsewhere (such as on suspension 42) and coupled to slider 100 by an optical channel. Laser 130 typically emits light having a wavelength of 780-980 nm. Optical waveguide 132 guides light from laser 130 to near-field transducer (NFT) 140. NFT 140 typically comprises a low loss metal (e.g., gold, silver, aluminum, or copper) shaped to concentrate surface charge motion at a tip located at the slider ABS when light from waveguide 132 is incident. NFT 140 concentrates the light from laser 130 into a tiny spot that is small enough to momentarily heat a single bit 52 in recording layer 50. This localized heating reduces the coercivity of the magnetic material in that spot, allowing the magnetic orientation of bit 52 to be changed more easily, and in general allowing the HAMR head to write data at much higher densities than in conventional magnetic recording.

To effectively heat recording layer 50, NFT 140 must be very close to disk surface 17, typically on the order of a few nanometers. A write spacing sensor 142 may be configured near NFT 140 to measure and control spacing of NFT 140 and write portion 120 from disk surface 17 based on changes in temperature of NFT 140. In one non-limiting example, write spacing sensor 142 is a near-field temperature sensor (NTS). NTS 142 operates in a similar fashion to ECS 114. As NFT 140 gets closer to disk surface 17, the amount of heat transferred to NFT 140 from disk surface 17 increases, causing its temperature to rise. This change in temperature causes the temperature of NTS 142 to rise, resulting in a change in electrical resistance that can be measured to estimate head-disk spacing. The exact placement and configuration of write spacing sensor 142 within write portion 120 may vary; the placement and configuration shown in FIG. 3A is merely one non-limiting example. In addition, while an NTS is one example of a write spacing sensor 142, other types of write spacing sensors may be used.

Figure 3B:
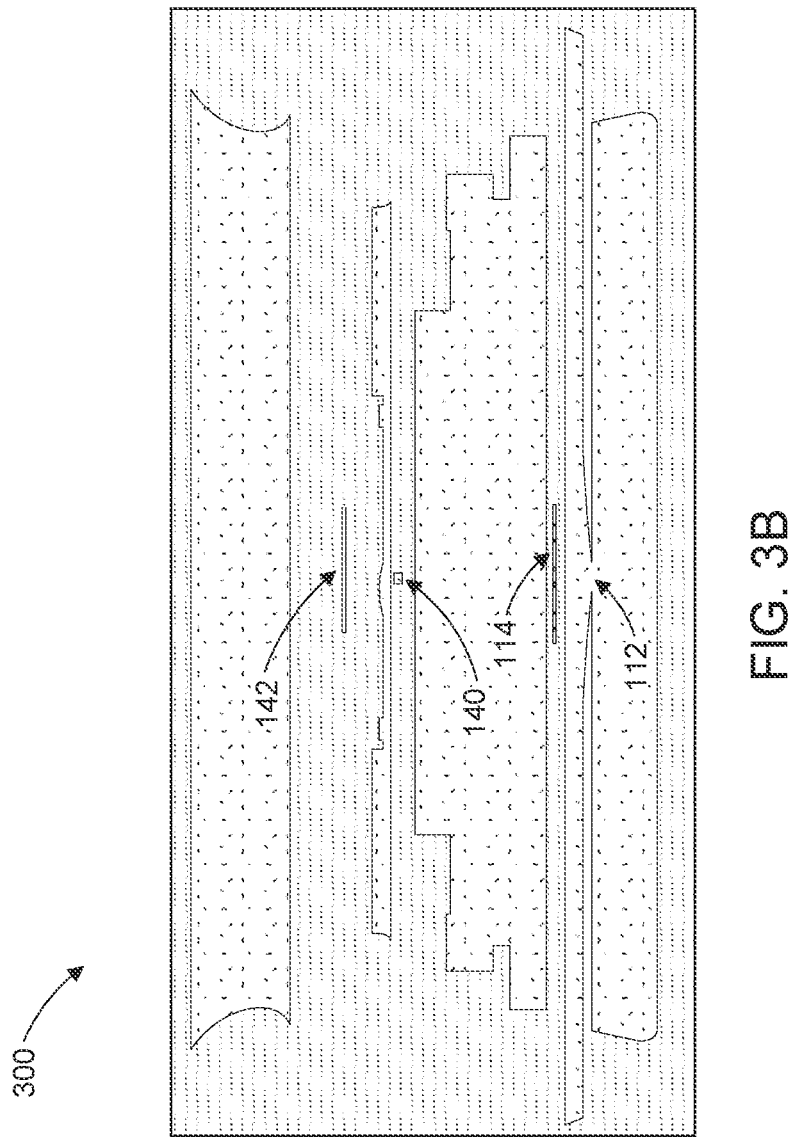
FIG. 3B is a cross-sectional view of an exemplary thin film magnetic read/write head structure configured with a read spacing sensor and a write spacing sensor, in accordance with aspects of this disclosure.

FIG. 3B is a cross-sectional view of an exemplary thin film magnetic read/write head structure 300 configured with read spacing sensor 114 such as an ECS a write spacing sensor 142 such as an NTS, according to aspects of this disclosure. As can be seen in FIG. 3B, read spacing sensor 114 is positioned near read head 112 to precisely measure the spacing of read head 112 from disk surface 17, and write spacing sensor 142 is configured near NFT 140 to precisely measure the spacing of NFT 140 from disk surface 17.

Figure 3C:
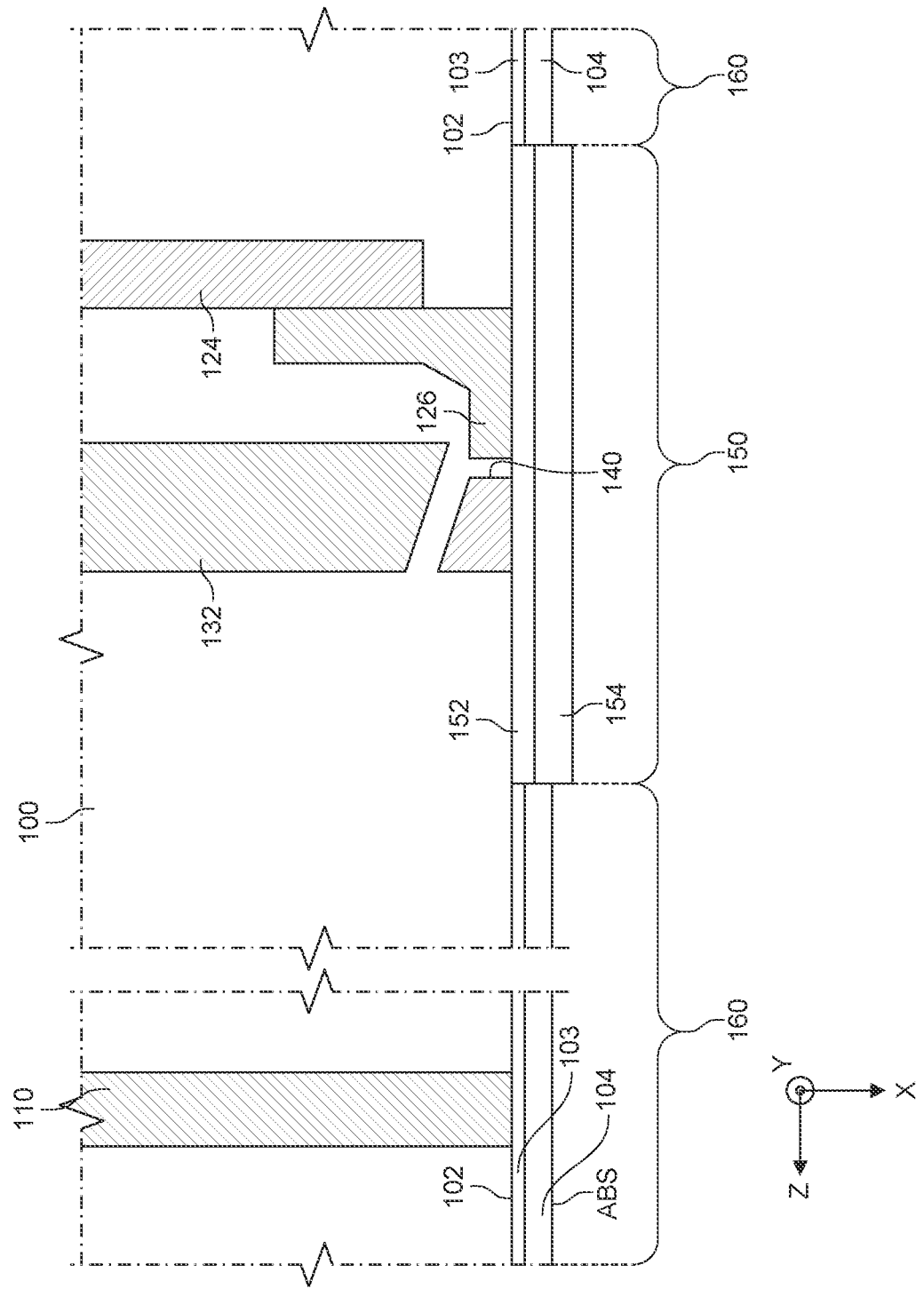
FIG. 3C is a conceptual sectional diagram of a portion of a slider having a near-field transducer covered by protective window, in accordance with aspects of this disclosure.

Degradation of NFT 140 sometimes occurs as a result of slider-disk frictional heating and contact and/or accelerated oxidation of slider overcoat 104 due to high air pressure at the ABS caused by high disk rotational speed. For this reason, as shown in FIG. 3C, a protective window 150 may be provided in some embodiments over NFT 140 and write pole 126. In some examples, protective window 150 includes inner silicon nitride layer 152 and outer metal oxide layer 154, and has a total thickness of about 2.5 nm. Regions 160 outside of window region 150, such as read head 112, are not covered by window 150 but are protected by overcoat 104 (typically DLC) on disk-facing surface 102 of slider 100, with adhesion film 103 possibly disposed between overcoat 104 and disk-facing surface 102.

The spacing of read portion 110 and write portion 120 from disk surface 17 is subject to significant head-to-head variation between different heads and over different temperatures. Head-to-head spacing variation may be due to multiple factors including pole tip recession (PTR) variation, which refers to differences in protrusion of the read/write pole tips relative to the ABS of the slider. Changes in PTR can affect head-to-disk surface spacing since it affects how far the read and write elements extend toward the disk surface. Temperature variations can also influence the spacing between the read/write elements and the disk surface. This is largely due to isothermal protrusion differences at different temperatures. Isothermal protrusion refers to the expansion or contraction of parts of the head assembly in response to temperature changes. Because different parts of the assembly can expand or contract by different amounts, this can lead to changes in spacing at different temperatures.

Figure 4A:
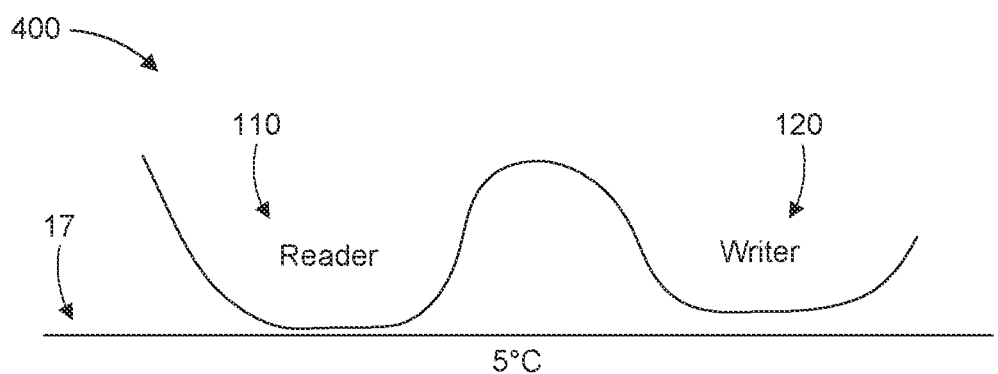
FIG. 4A is a conceptual diagram illustrating the isothermal protrusion effect on spacing of read and write portions of the head from the disk surface at 5° C., in accordance with aspects of this disclosure.
Figure 4B:
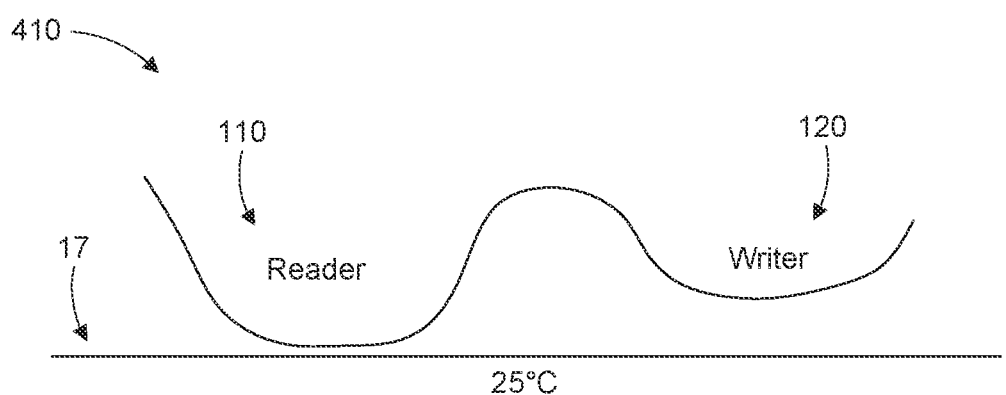
FIG. 4B is a conceptual diagram illustrating the isothermal protrusion effect on spacing of read and write portions of the head from the disk surface at 25° C., in accordance with aspects of this disclosure.
Figure 4C:
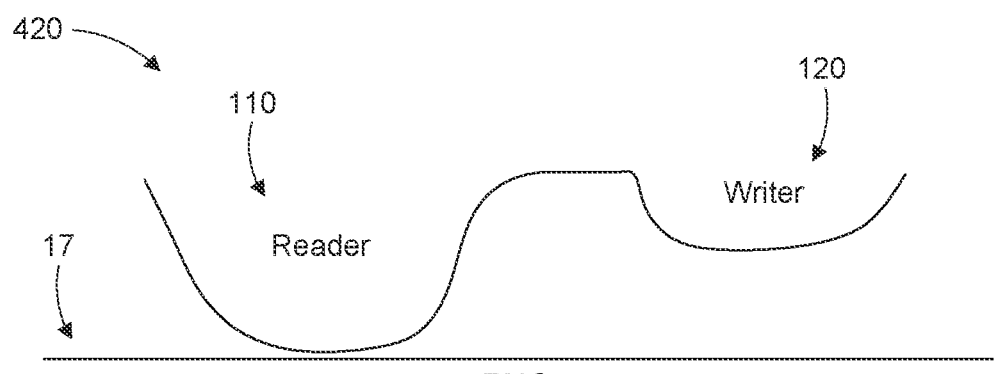
FIG. 4C is a conceptual diagram illustrating the isothermal protrusion effect on spacing of read and write portions of the head from the disk surface at 70° C., in accordance with aspects of this disclosure.

FIGS. 4A-4C are conceptual diagrams illustrating the isothermal protrusion effect on the spacing of read portion 110 and write portion 120 of head 18 from disk surface 17 at different temperatures, according to aspects of this disclosure. Diagram 400 of FIG. 4A illustrates the isothermal protrusion effect at 5° C.; diagram 410 of FIG. 4B illustrates the isothermal protrusion effect at 25° C.; and diagram 420 of FIG. 4C illustrates the isothermal protrusion effect at 70° C. As can be seen in FIGS. 4A-4C, read portion 110 is generally unaffected by the temperature of the environment in which HDD 15 is utilized. Conversely, while write portion 120 is close to disk surface 17 at 5° C. (FIG. 4A), it is spaced further from disk surface 17 at 25° C. (FIG. 4B), and even further at 70° C. (FIG. 4C). Due to this isothermal protrusion effect, the spacing of write portion 120 from disk surface 17 increases by about 2.2 nm over a temperature range of 5°–70° C., which is a typical operating range of an HDD.

Figure 4D:
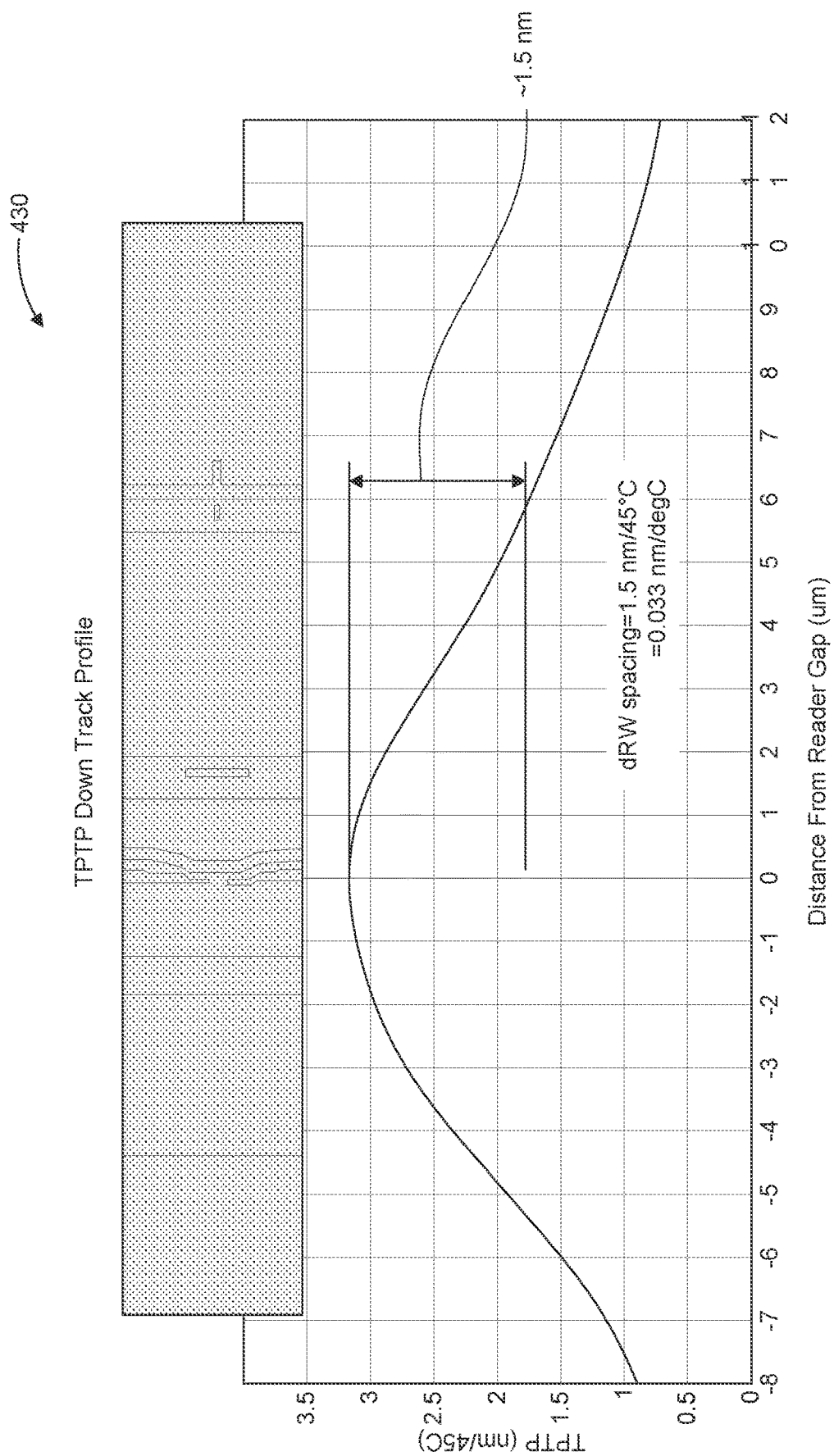
FIG. 4D is a graph illustrating the isothermal protrusion effect on spacing of the head from the disk surface, in accordance with aspects of this disclosure.

FIG. 4D is a graph 430 highlighting the isothermal protrusion effect on the spacing of head 18 from disk surface 17, according to aspects of this disclosure. The horizontal axis is the distance from the read gap (between read shields S1 and S2, where read head 112 is disposed), and the vertical axis is the change in head spacing, also referred to thermal pole tip protrusion (TPTP), in nanometers per 45° C. in temperature change. TPTP represents how much head 18 moves closer to or further from disk surface 17 due to heat-induced physical expansion or contraction of materials. As shown in FIG. 4D, the average variation in head spacing (dRW) is 1.5 nm per 45° C. temperature change. Broken down to a per-degree basis, this equates to approximately 0.033 nm per degree Celsius.

Figure 5:
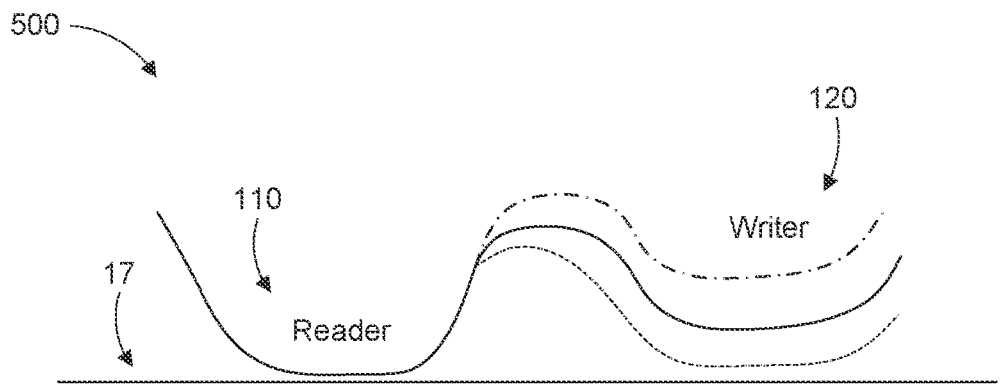
FIG. 5 is a conceptual diagram depicting the pole tip recession effect on spacing of the read and write portions of the heads from the disk surface, in accordance with aspects of this disclosure.

FIG. 5 is a conceptual diagram 500 that illustrates the impact of pole tip recession (PTR) on spacing between read portion 110 and write portion 120 and disk surface 17, according to aspects of this disclosure. PTR refers to the difference in height between the bottom surface of the pole tips (i.e., read pole 112 and write pole 126 and the bottom surface of slider 100. The PTR effect can lead to an undesired increase in spacing between write portion 120 and disk surface 17. In one non-limiting example, the PTR effect on the spacing of write portion 120 from disk surface 17 is about +0.93 nm, with a maximum value of 1.86 nm, when the standard deviation is about 0.31 nm. Variations in the fly height of slider 100 also contribute to variations in head spacing, with a typical case exhibiting approximately 0.88 nm of variation. The combination of the isothermal protrusion effect, the PTR effect, and the slider fly height effect on spacing results in a large variation in writer head spacing.

To overcome these variable effects on head spacing, dual thermal heaters may be incorporated into read/write head 18 to effect targeted thermal expansion of read portion 110 and write portion 120, such that spacing between the read and write portions of head 18 and disk surface 17 can be more carefully controlled. Returning to FIG. 3A, read heater 170 (TFC1) is positioned near read portion 110 and write heater 180 (TFC2) is positioned near write portion 120. In one non-limiting example, heaters 170 and 180 comprise heater resistors to which electrical signals are applied to cause a desired thermal expansion of read portion 110 and/or write portion 120. Heaters 170 and 180 may take any suitable form and be in any location appropriate to cause thermal expansion of read portion 110 and/or write portion 120 when engaged.

There are several modes or techniques for using or powering dual heaters 170 and 180. In dual independent heater (DIH) mode, read heater 170 (TFC1) is used only during read operations, and write heater 180 (TFC2) is used only during write operations. In other modes, power may be applied to both heaters simultaneously according to a dual heater ratio (DHR) or power ratio (PR), where:

$$DHR(PR)=TFC1/(TFC1+TFC2)$$

In the DHR, TFC1 is the power applied by read heater 170, and TFC2 is the power applied by write heater 180. Thus, the DHR is defined in terms of the read heater; i.e., a DHR of 30% means that the read heater is receiving 30% of the power applied to both heaters. While defined in terms of the read heater, a DHR of 30% also conveys of course that the write heater is receiving 70% of the power applied to both heaters.

Figure 6:
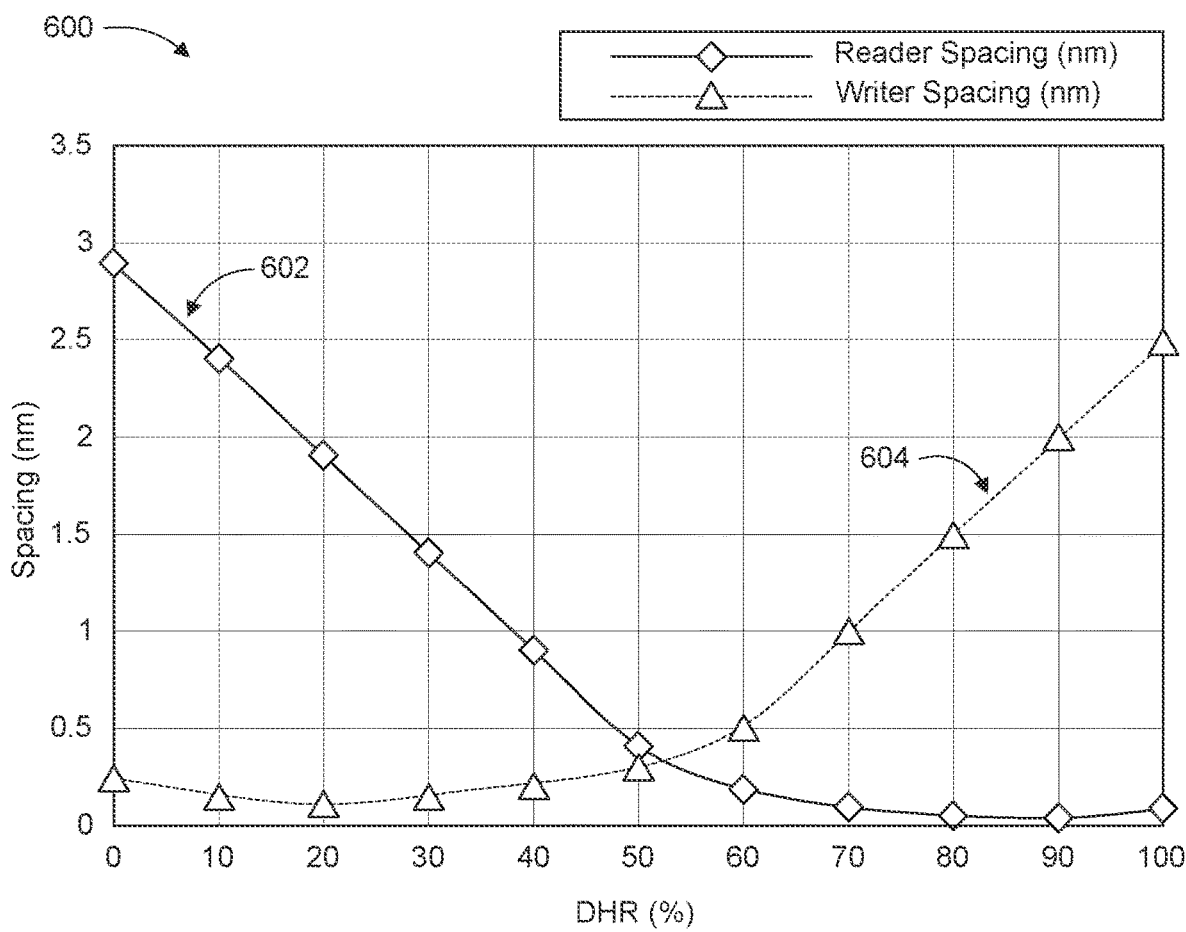
FIG. 6 is a graph showing spacing of the read and write portions from the disk surface over a range of dual heater ratio (DHR) percentages, in accordance with aspects of this disclosure.

By setting the DHR, read heater 170 (TFC1) and write heater 180 (TFC2) are controlled to adjust the protrusion of read portion 110 and write portion 120. FIG. 6 is an exemplary graph 600 that plots spacing (in nm) from disk surface 17 on the vertical axis against the dual heater ratio (DHR %) on the horizontal axis for reader portion 110 (reader spacing curve 602) and writer portion 120 (writer spacing curve 604). Reader spacing curve 602 shows how changes in DHR % (i.e., changes in the relative power of the read heater compared to the total heater power) affect the spacing of read portion 110 from disk surface 17. Writer spacing curve 604 shows the corresponding relationship for write portion 120. By adjusting the DHR, the head-disk spacing for reading and writing can be finely controlled to optimize performance. Higher DHR % values correspond to a higher proportion of total heater power being applied to read heater 170, which generally increases protrusion of read portion 110 and decreases its spacing from disk surface 17. Likewise, lower DHR % values correspond to a higher proportion of total heater power being applied to write heater 180, which generally increases protrusion of write portion 120 and decreases its spacing from disk surface 17.

Figure 7A:
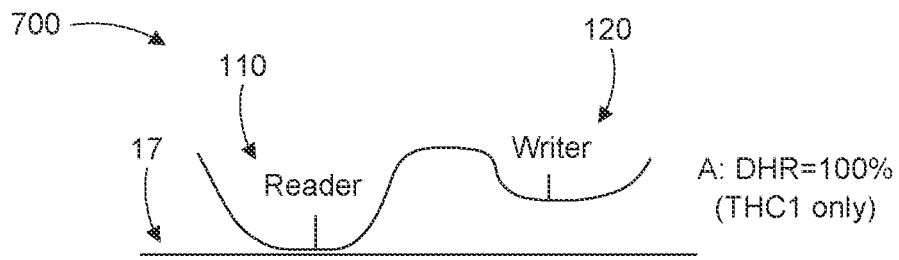
FIGS. 7A-7D are conceptual diagrams illustrating the effect of the DHR on the spacing of the read and write portions from the disk surface, in accordance with aspects of this disclosure.
Figure 7B:
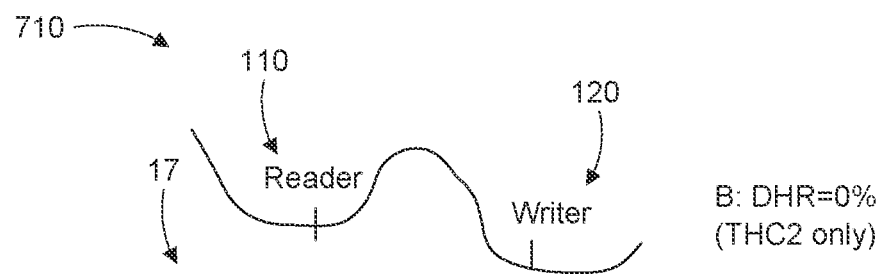
Figure 7C:
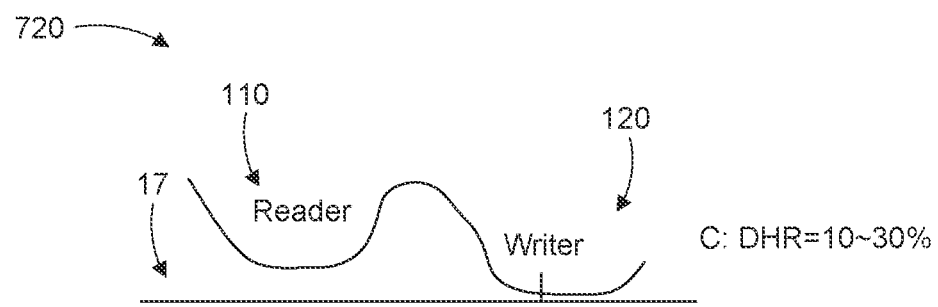
Figure 7D:
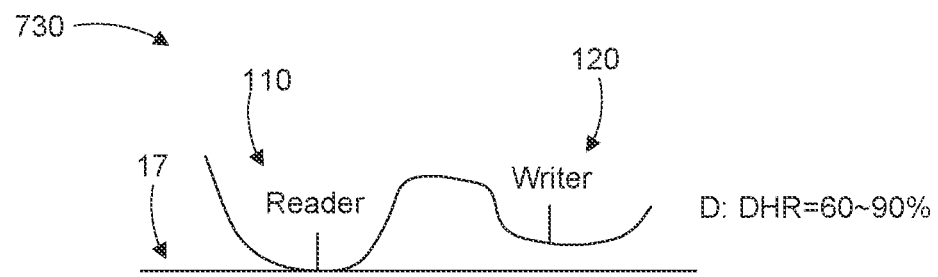

FIGS. 7A-7D are conceptual diagrams illustrating the effect of DHR on the spacing of read portion 110 and write portion 120 from disk surface 17, in accordance with aspects of this disclosure. In diagram 700 of FIG. 7A, DHR=100%, meaning that all power is supplied to read heater 170 (TFC1) and no power is supplied to write heater 180 (TFC2). With DHR=100%, read portion 110 is very close to disk surface 17 and write portion 120 is substantially spaced from disk surface 17. In diagram 710 of FIG. 7B, DHR=0%, meaning that no power is supplied to read heater 170 and all power is supplied to write heater 180 (TFC2). With DHR=0%, read portion 110 is substantially spaced from disk surface 17 and write portion 120 is very close to disk surface 17. In diagram 720 of FIG. 7C, DHR=10~30%, meaning that more heater power is being supplied to write heater 180 relative to read heater 170. With DHR=10~30%, write portion 120 is close to disk surface 17 and read portion 110 is more spaced from disk surface 17, though not as spaced as when DHR=0% (FIG. 7B). In diagram 730 of FIG. 7D, DHR=60~90%, meaning that more heater power is being supplied to read heater 170 relative to write heater 180. With DHR=60~90%, read portion 110 is very close to disk surface 17 and write portion 120 is more spaced from disk surface 17, though not as spaced as when DHR=100% (FIG. 7A).

In conventional HDD manufacture and operation, a DHR for reading (DHRr) and a DHR for writing (DHRw) are sometimes set to be the same for all heads in an HDD, without accounting for large PTR variations from head-to-head and/or different temperatures in which the HDD is operated. Some examples of typical settings are as follows. In DIH mode, described above, a DHRr of 100% (all power applied to read heater) is used for reading (FIG. 7A) and a DHRw of 0% (all power applied to write heater) is used for writing (FIG. 7B), which provides minimum spacing for both reading and writing. In fixed low DHR mode, a DHRr of 100% (FIG. 7A) is used for reading and a DHRw of 10~30% (FIG. 7C) is used for writing, which provides minimum spacing for reading and extremely small spacing for writing. In fixed high DHR mode "A", a DHR of 60~90% (FIG. 5D) is used for both reading and writing (i.e., DHRr=DHRw). Fixed high DHR mode "A" is advantageous in that touchdown (TD) is always at reader shields. In fixed high DHR mode "B", a DHRr of 100% is used for reading (FIG. 5A) and a DHRw of 60~90% is used for writing (FIG. 5D).

The "bulge profiles" of FIGS. 8A-8D and FIGS. 9A-9D illustrate in more detail the impact that read heater 170 and write heater 180 have on the spacing of head components. FIGS. 8A-8D illustrate spacing for a head that has no protective write window over the NFT/write pole components, such as the configuration of FIG. 3A, and FIGS. 9A-9D illustrate spacing for a head that has a protective write window, such as window 150 of FIG. 3C. In FIGS. 8A-8D and 9A-9D, physical spacing from the disk surface in nanometers is shown on the vertical axis, and the distance downtrack from the silicon substrate (AlTiC) border in micrometers is shown on the horizontal axis; the read gap (RG) or read head location is shown by the vertical dashed line at about 6 μm; the write pole (P2) location is shown by the vertical dashed line at about 11 μm, and the ECS and NTS locations are as indicated.

Figure 8A:
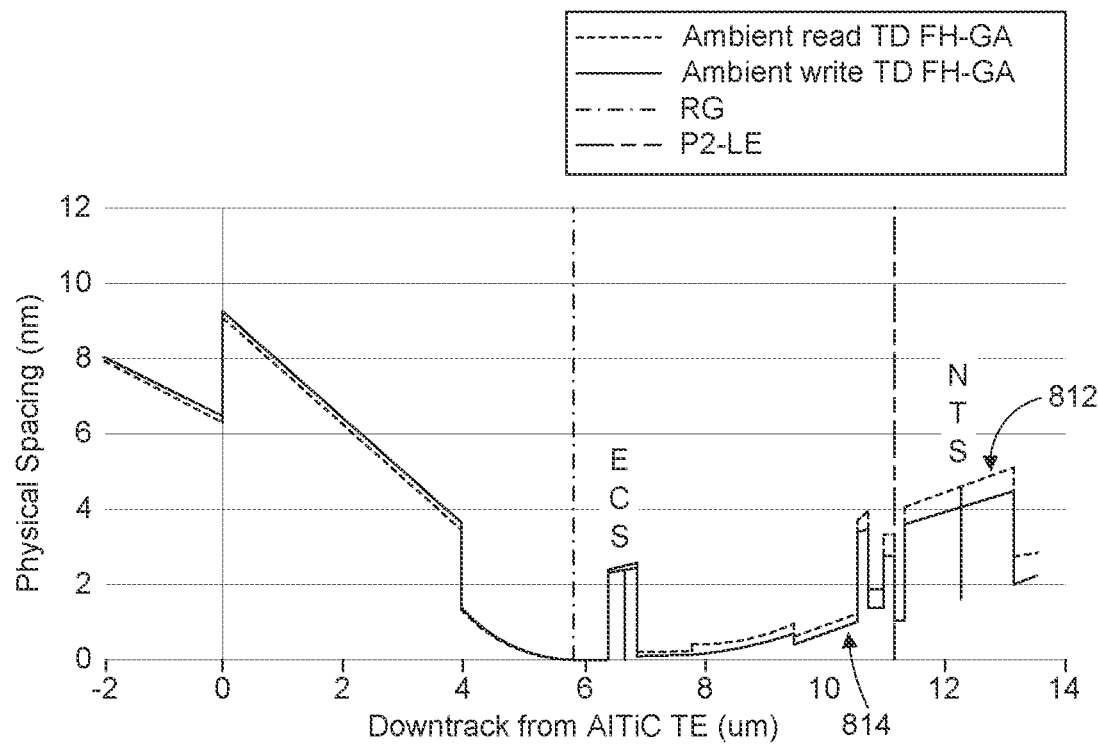
FIGS. 8A-8D are bulge profiles showing the spacing of head components from the disk surface during read and write operations in a head without an NFT and a write pole protective window, in accordance with aspects of this disclosure.
Figure 8B:
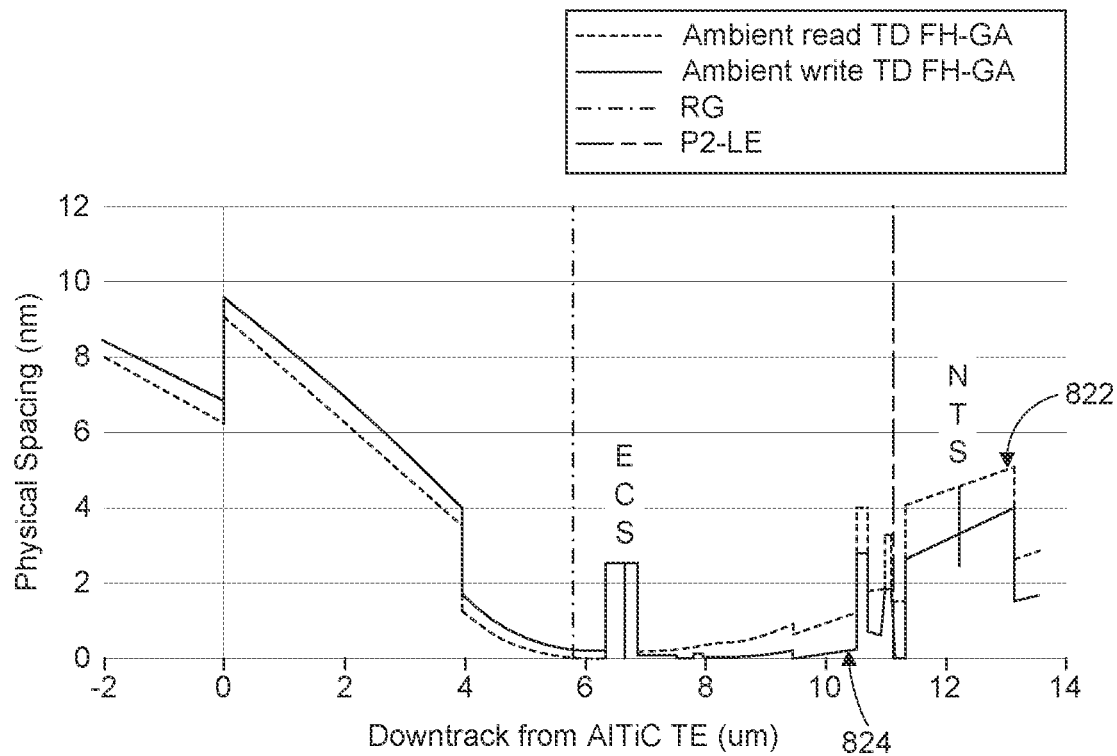

FIGS. 8A and 8B illustrate bulge profiles for a head without a protective NFT/write pole window, with only read heater 170 (TFC1) engaged (i.e., DHR=100%). Read profile 812 of FIG. 8A (dashed line) shows head component spacing at read touchdown (TD) with read heater 170 engaged and write profile 814 (solid line) shows head component spacing at write TD with read heater 170 engaged and a write current applied to the write pole. Comparing profiles 812 and 814, the read components (including the ECS and read head) are very close to the disk surface during both read and write TD, and the write components (including the NTS and the write pole) are spaced from the disk surface during write TD and spaced slightly further from the disk surface during read TD.

Read profile 822 of FIG. 8B (dashed line) shows head component spacing at read TD with read heater 170 engaged and write profile 824 (solid line) shows head component spacing at TD at write TD with read heater 170 engaged, a write current applied to the write pole, and the HAMR laser activated. Read profile 822 is similar to read profile 812 of FIG. 8A (read components close to disk surface at both read and write TD). Write profile 824 shows that the write components are about 1 nm closer to the disk surface as compared to write profile 814 of FIG. 8A, as a result of the heating of NFT 142 during HAMR.

Figure 8C:
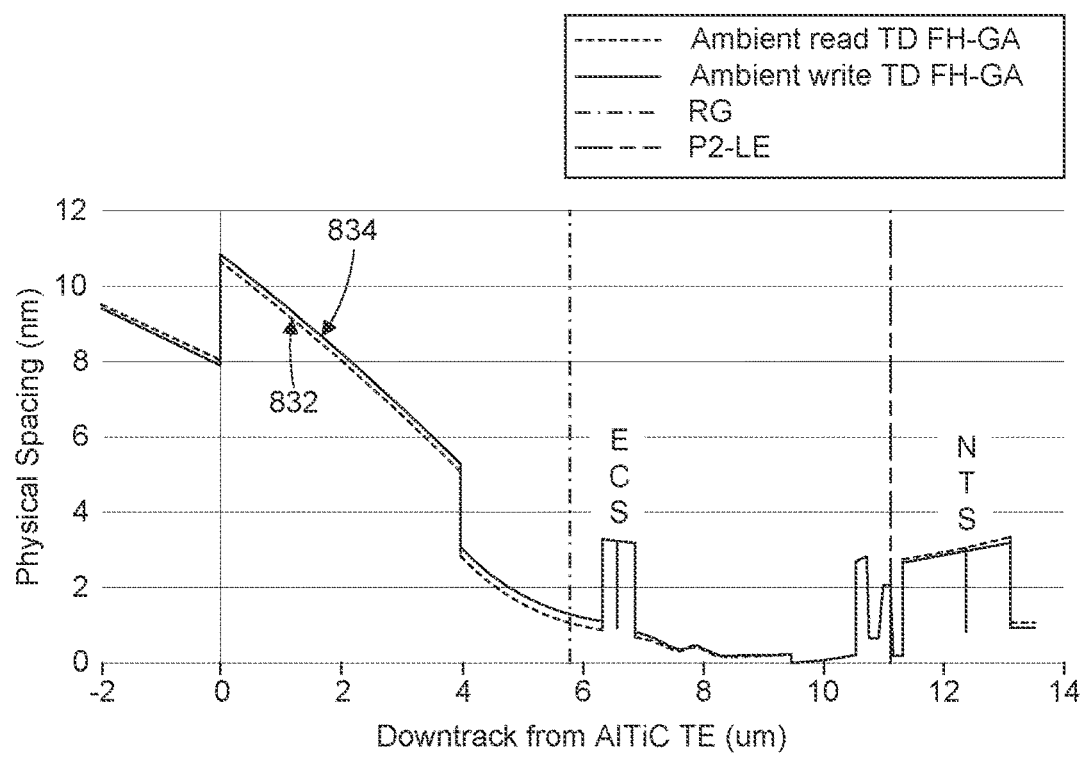
Figure 8D:
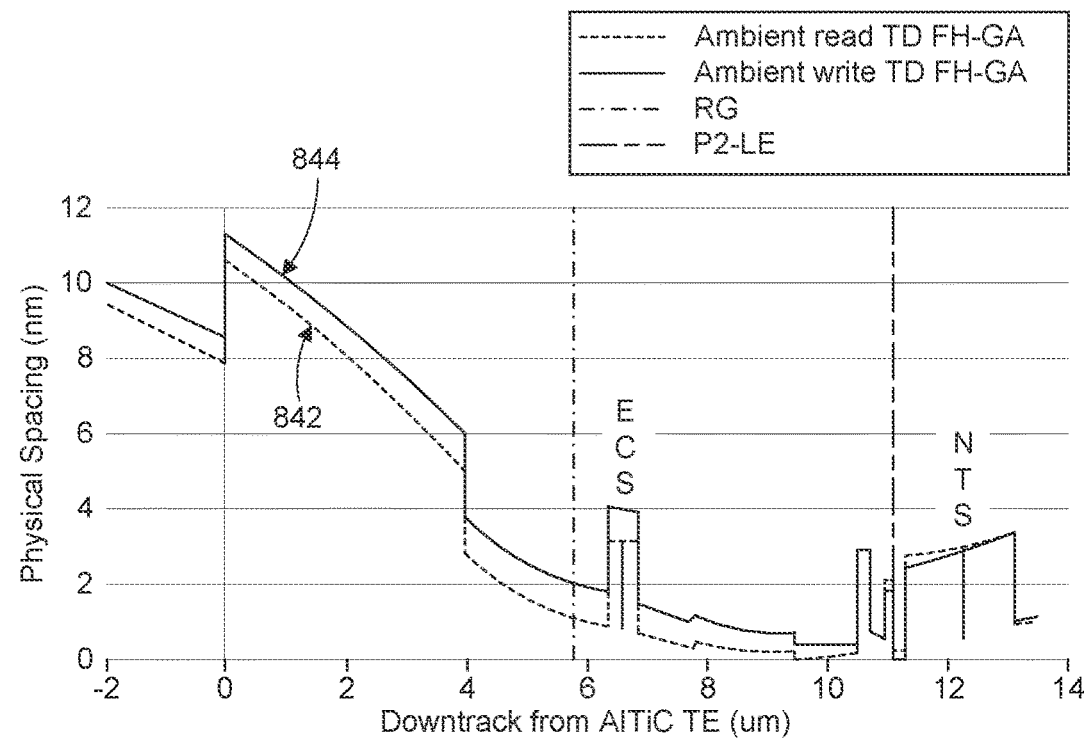

FIGS. 8C and 8D illustrate bulge profiles for a head without a protective write window, with only write heater 180 (TFC2) engaged (i.e., DHR=0%). Read profile 832 of FIG. 8C (dashed line) shows head component spacing at read TD with write heater 180 engaged and write profile 834 (solid line) shows head component spacing at write TD with write heater 180 engaged and a write current applied to the write pole. Comparing profiles 832 and 834, the read components (including the ECS and read head) are slightly spaced from the disk surface at both read TD and write TD, and the write components (including the NTS and the write pole) are very close to the disk surface at both read TD and write TD.

Read profile 842 of FIG. 8D (dashed line) shows head component spacing at read TD with write heater 180 engaged and write profile 844 (solid line) shows head component spacing at write TD with write heater 180 engaged, a write current applied to the write pole, and the HAMR laser activated. Read profile 842 is similar to read profile 832 of FIG. 8C (read components spaced from disk surface at both read TD and write TD). Write profile 844 shows that the write components remain very close to the disk surface at write TD, but that the read components are spaced slightly further from the disk surface at write TD, despite the heating of NFT 142 during HAMR.

Figure 9A:
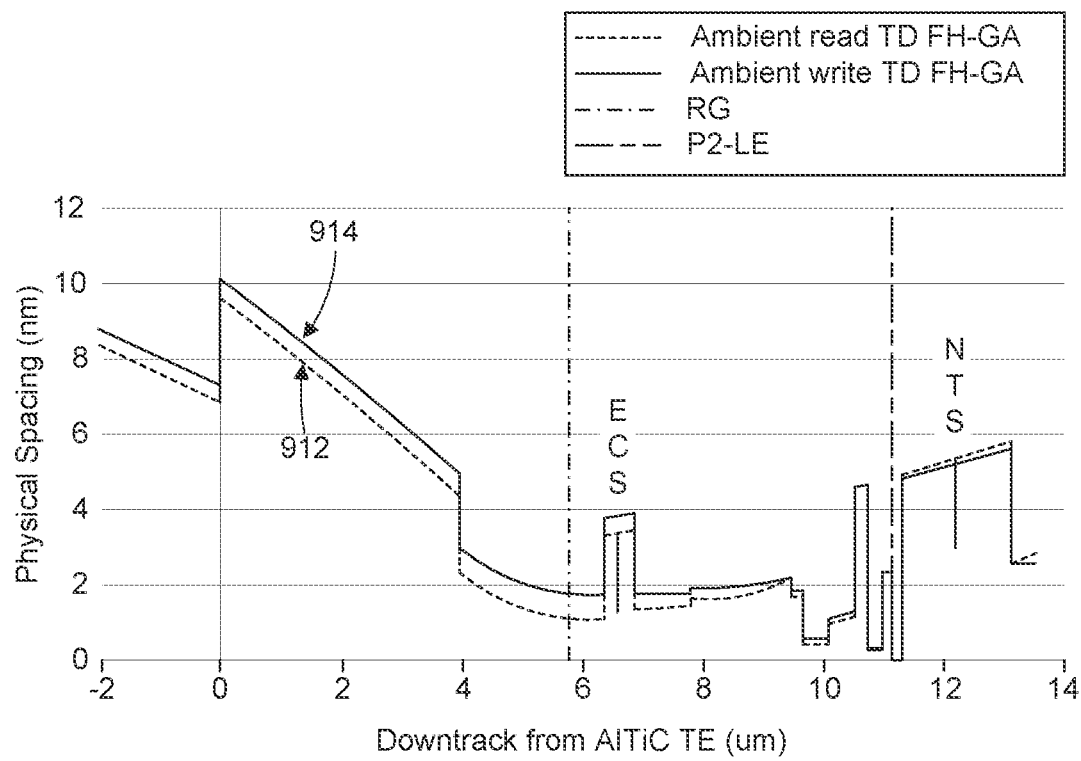
FIGS. 9A-9D are bulge profiles showing the spacing of head components from the disk surface during read and write operations in a head with an NFT and a write pole protective window, in accordance with aspects of this disclosure.
Figure 9B:
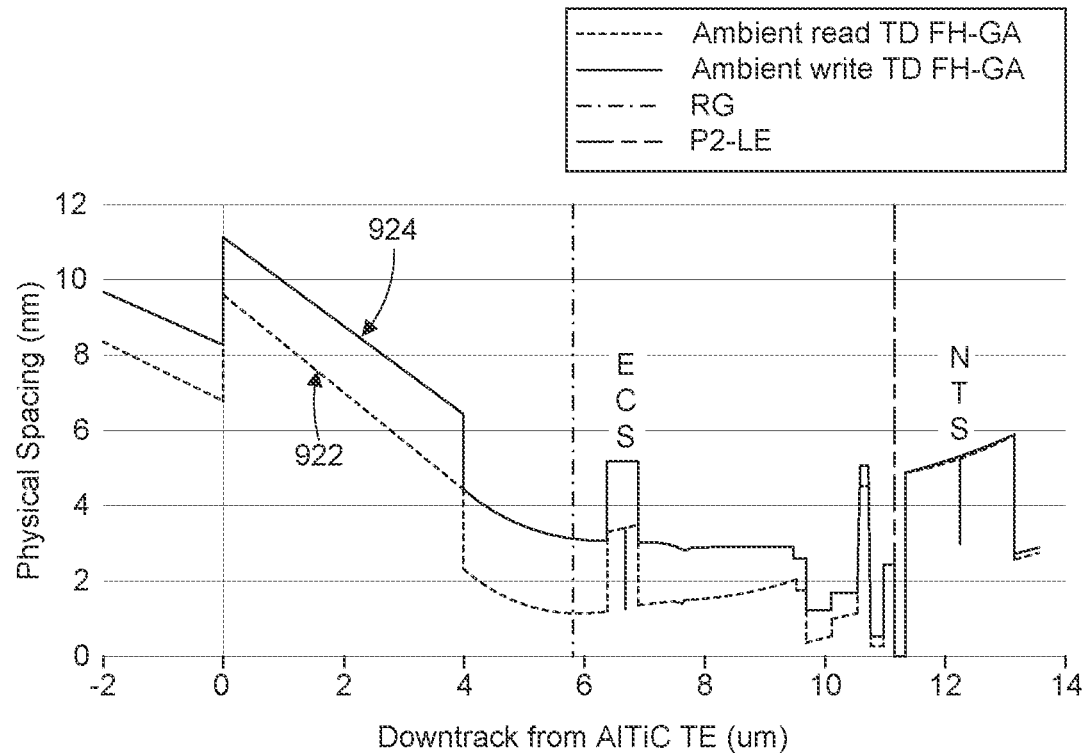
Figure 9C:
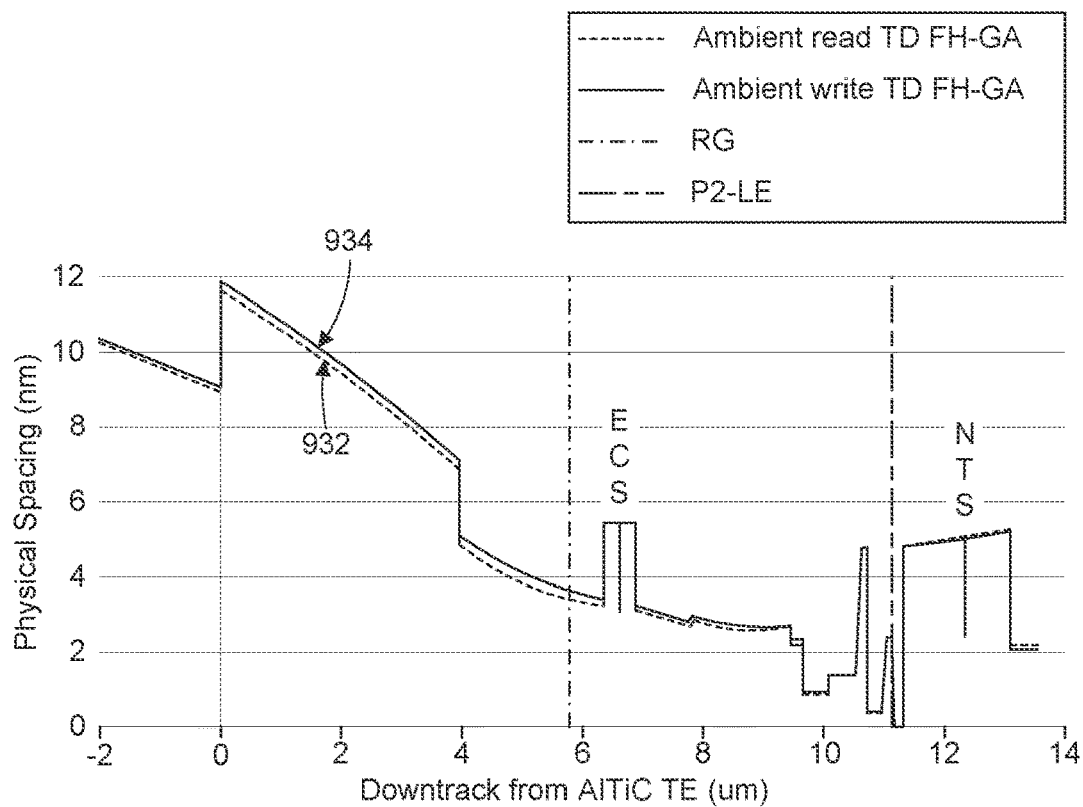
Figure 9D:
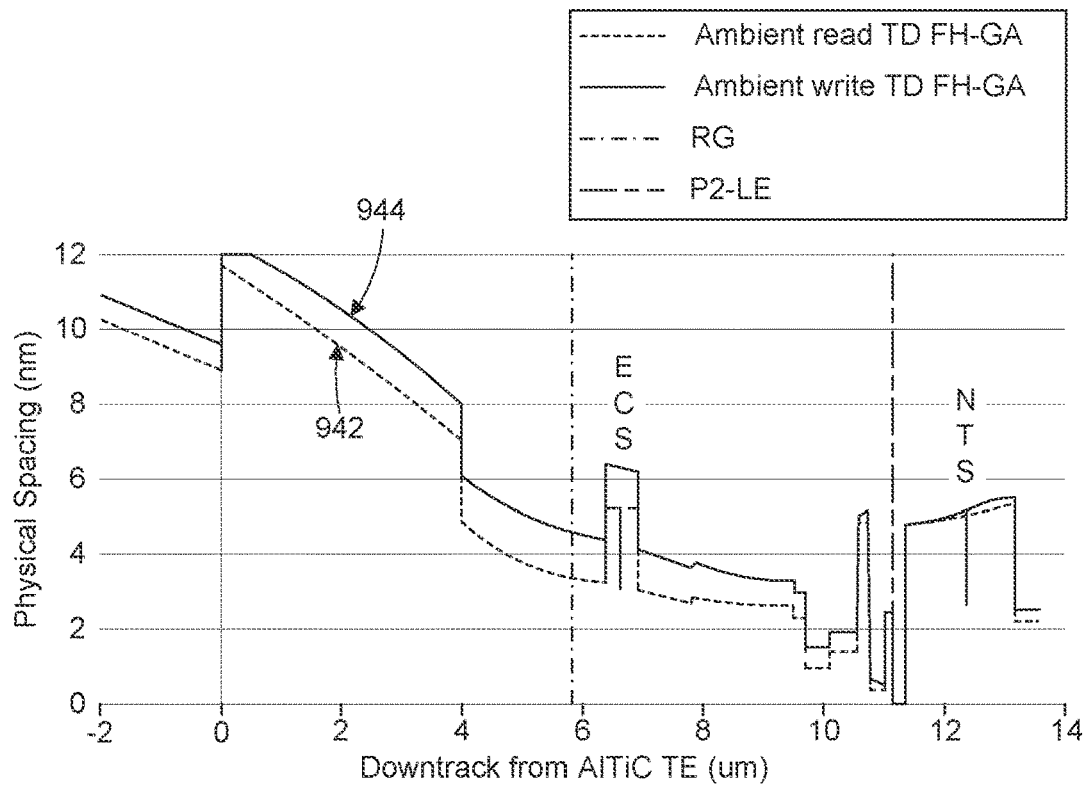

FIGS. 9A-9D illustrate spacing for a head that has a protective write window, such as window 150 of FIG. 3C. FIGS. 9A and 9B illustrate read profiles 912, 922 (dashed lines) and write profiles 914, 924 (solid lines) with only read heater 170 (TFC1) engaged (i.e., DHR-100%), and FIGS. 9C and 9D illustrate read profiles 932, 942 (dashed lines) and write profiles 934, 944 (solid lines) with only write heater 180 (TFC2) engaged (i.e., DHR=0%). Notably, the write portion is relatively close to the disk surface at both read TD and write TD and whether read heater 170 or write heater 180 is engaged, due to the write protective window having a total thickness of about 2.5 nm. By contrast, due to the presence of the write protective window, the read portion remains spaced from the disk surface during both read TD and write TD, whether read heater 170 or write heater 180 is engaged. The read portion is closer to the disk surface with read heater 170 engaged (FIGS. 9A and 9B), however, than with write heater 180 engaged (FIGS. 9C and 9D). Otherwise, the read and write profiles of FIGS. 9A-9D are similar to those of FIGS. 8A-8D.

As can be seen from FIGS. 8A-8D and 9A-9D, the use of fixed heater ratios (in this example, 0% or 100%) can yield a variety of different profiles having different TD characteristics depending on variables such as whether a protective window is present and, with respect to write TD, whether write current and laser current are also applied in addition to the read or write heater. The use of fixed heater ratios, as in these examples, may be convenient as an initial or default setting. However, the use of fixed DHR settings across a large number of heads assumes a static situation, in which application of a particular heater ratio during a particular read or write operation always produces the same spacing effects on the read and write components and does not vary from head-to-head. This assumption cannot reliably be made. Substantial topography variations (such as PTR variation, for example) may occur from head-to-head in HDD manufacturing and may continue to occur or be exacerbated during HDD use. PTR variation has a substantial effect on the spacing of head components from the disk surface, whereas effective and efficient use of fixed heater ratios requires a common and unchanging topography among all heads.

FIGS. 10A-10D are exemplary "Monte Carlo" (MC) simulations showing a range of head spacing or "bulge" profiles at write TD and read TD for multiple thin film heads of the same type or configuration. The exemplary simulations of FIGS. 10A-10D model spacing distributions of topographical features of one hundred different heads having an expected or nominal spacing at TD, along with a standard deviation or "sigma". Thus, the modeling of FIGS. 10A-10D incorporates various assumptions about the expected amount of pole tip recession (PTR), as well the standard PTR deviation or sigma. The modeling of FIGS. 10A-10D is with DHR=100% (i.e., with only read heater TFC1 engaged).

Figure 10A:
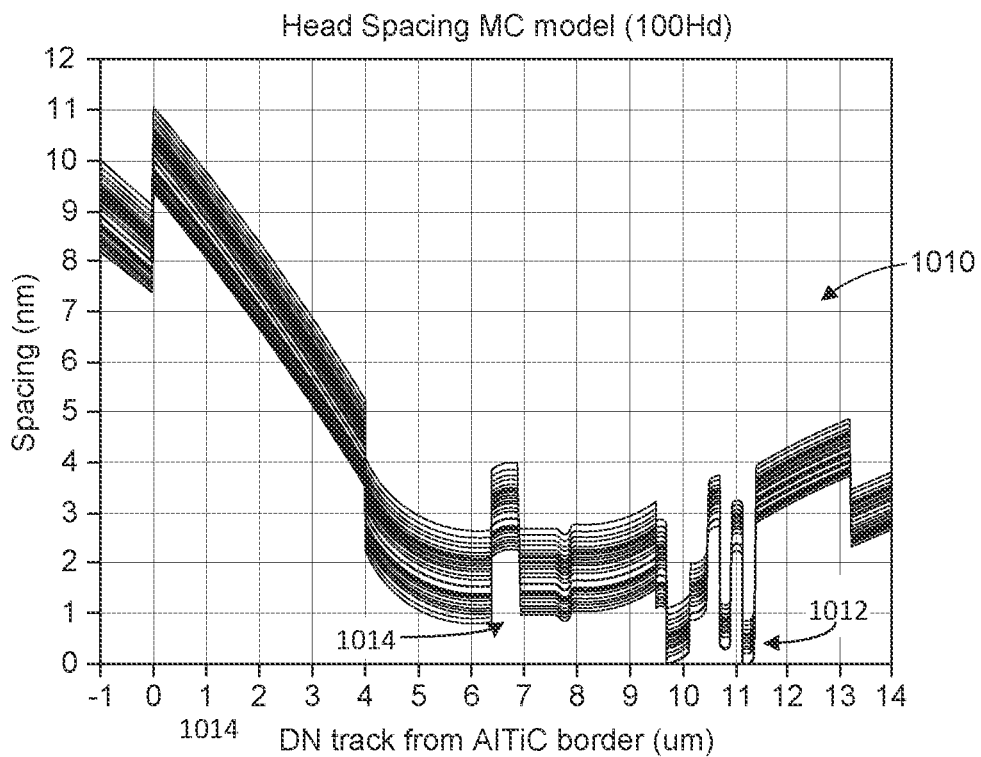
FIGS. 10A-10D are exemplary spacing distributions of topographical features of exemplary heads at write and read TD, according to aspects of this disclosure.
Figure 10B:
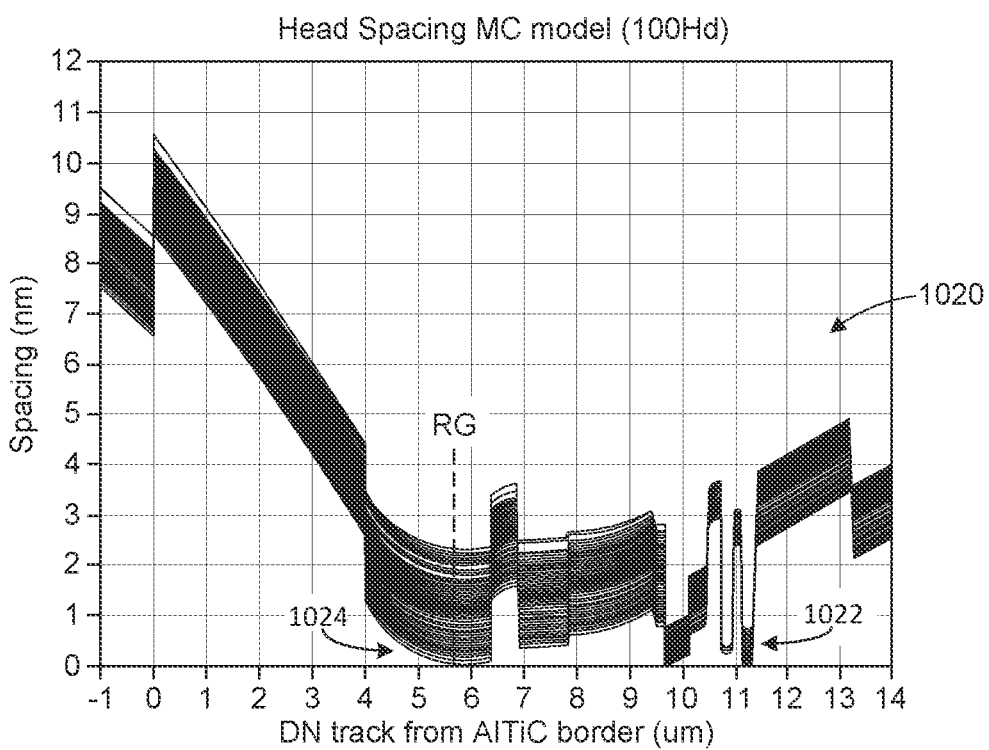

FIG. 10A is a spacing distribution 1010 of features of an exemplary head at write TD, with a protective write window present. As can be seen in FIG. 10A, there is a substantial amount of variation (sigma) in the spacing of read portion 1014 at write TD as compared to that of write portion 1012. FIG. 10B is a spacing distribution 1020 of features of an exemplary head at read TD, also with a protective write window present. Due to the presence of the protective write window, write portion 1022 has TD at read TD as well, and read portion 1024 continues to have substantial spacing sigma. As also seen in FIGS. 10A-B, the minimum spacing (low point) for read gap RG where the read head is configured may vary from within about 0.5 nm of the disk surface to nearly 3 nm away from the disk surface. As a 1 nm variation in spacing equates to about a 2% loss in areal achievable density (2% ACC loss), a variation in spacing of 2 nm or more equates to at least a 4% ACC loss. Thus, head-to-head variations in topography and pole tip recession have a very significant and negative impact on ACC loss.

Figure 10C:
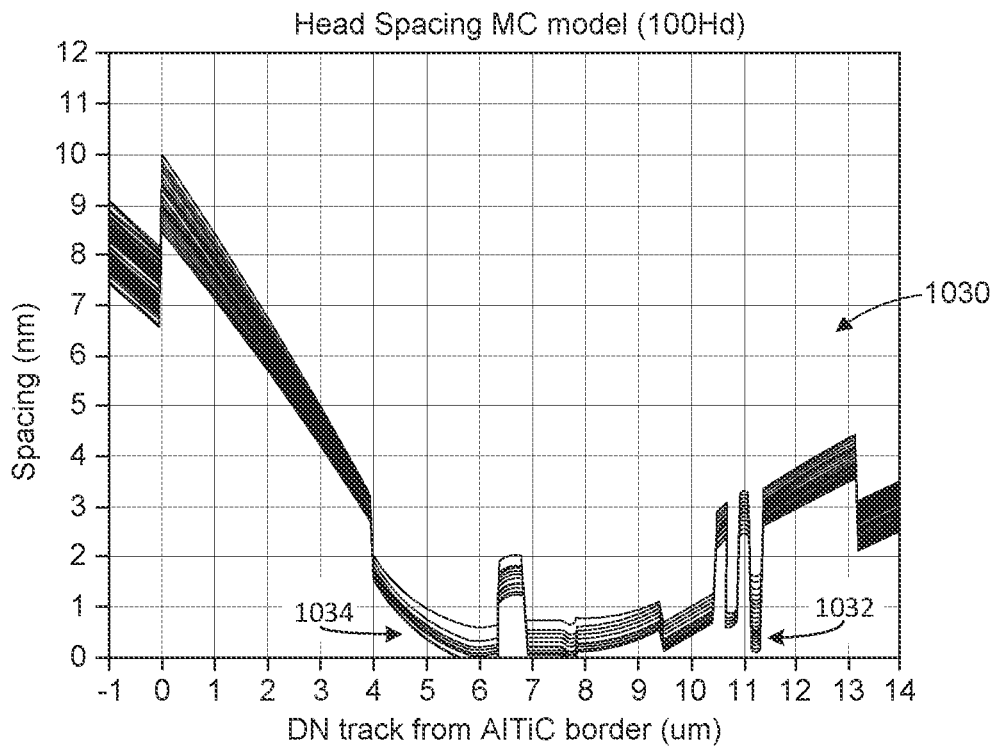
Figure 10D:
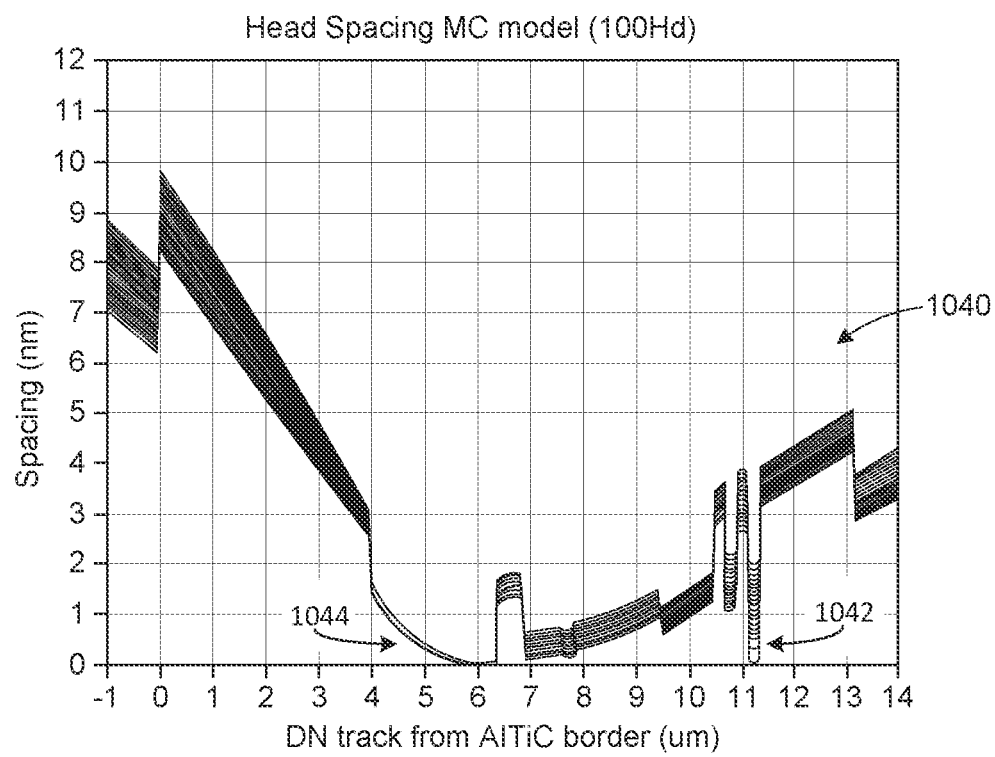

FIG. 10C is a spacing distribution 1030 of features of an exemplary head at write TD with no protective window present. While read portion 1034 has less spacing sigma than occurs with a protective write window present, there is now more spacing sigma in write portion 1032 along with uncertainty as to whether TD of write portion 1032 has actually occurred. FIG. 10D is an spacing distribution 1040 of features of an exemplary head at read TD with no protective window present. Here, read portion 1044 has TD with little spacing sigma present. However, write portion 1042 now has greater spacing sigma present with its minimum spacing (low point) varying by as much as 1 nm. Again, such topography variations can undesirably equate to substantial ACC loss.

To reduce ACC loss, there is a need for consistent and predictable spacing of head features at TD despite the difficulties posed by inherent and unpredictable variations in head topography. According to aspects of this disclosure, the ability to thermally expand the read and write portions of a head in varying amounts is leveraged to compensate for unpredictable head-to-head topography variations. According to aspects of this disclosure, during the head testing phase, read and write TD, as sensed by read and write spacing sensors, is determined over a range of DHRs. By optimizing the operating DHR of a particular head to be the DHR at which both read and write TD occur, variations in spacing of read and write portions of the head from the disk surface at TD are minimized. Using both read and write spacing sensors concurrently yields slope profiles for both read and write spacing, thereby reducing test time. Thus, according to aspects of this disclosure, the DHR of every head in a group of heads, every head in an HDD, every head in a group of HDDs, etc., can be dialed in to have similar TD behavior and spacing sensitivity, thereby compensating for PTR sigma and variation that occurs from part-to-part.

In the following description, it is important to note that physical TD of sensitive read and write elements of the head is not needed. According to aspects of this disclosure, precise and accurate indication of topography and PTR spacing variations can be obtained by the read and write spacing sensors during non-physical TD backoff (TDBO). In TDBO, when the head comes within a pre-defined spacing from the disk surface (such as 1 nm or 2 nm, for example) it is then backed off before contact occurs. Thus, references to "TD" or "TD detection" in the following description refer to TD as detected during TDBO, in addition to physical TD detection.

Figure 11A:
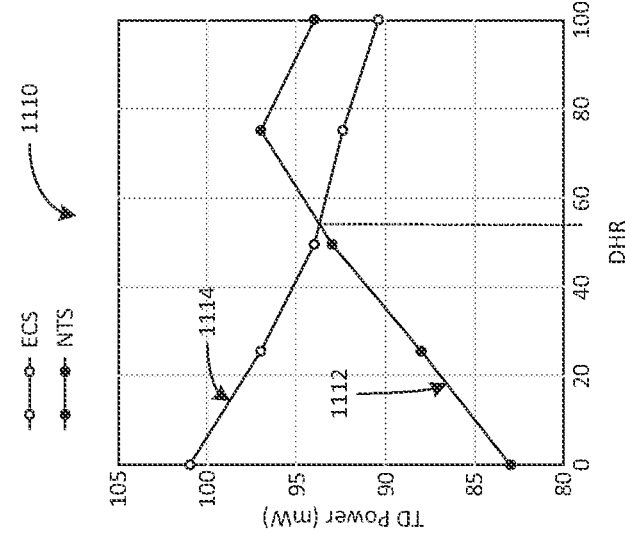
FIGS. 11A-11C are graphs, each for a different head having topography variations, of the total heater power required for detection of TD by write and read spacing sensors over a range of DHRs, according to aspects of this disclosure.
Figure 11B:
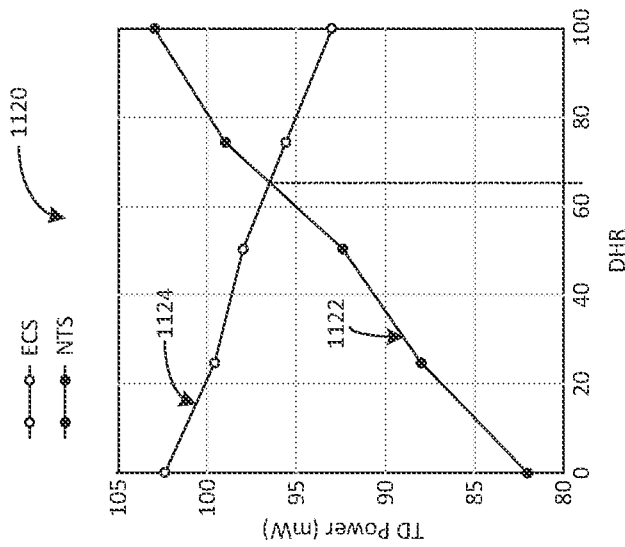
Figure 11C:
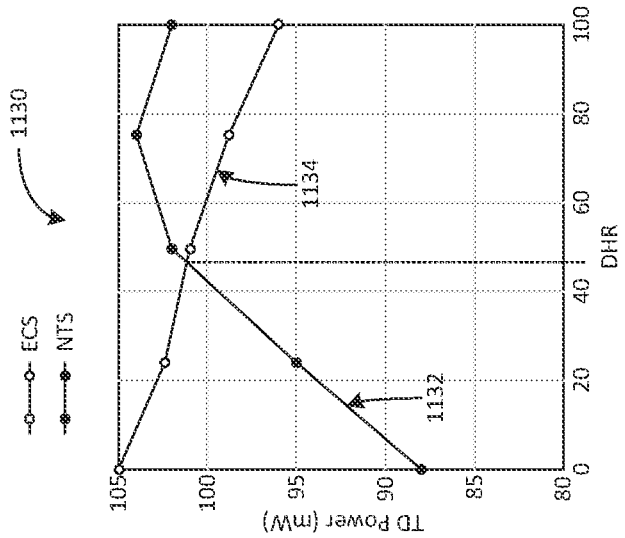

FIGS. 11A-11C are graphs 1110, 1120, 1130, each for a different head having varied spacing of topographical features, of the total heater power (vertical axes) at read TD and at write TD over a range of DHRs (horizontal axes), according to aspects of this disclosure. In some examples, write TD is detected by a write spacing sensor such as an NTS, and read TD is detected by a read spacing sensor such as an ECS. Plots 1112, 1122, 1132 of the total heater power required for TD detection by the write spacing sensor (NTS) over a range of DHRs are referred to herein as "write spacing slope profiles" or "NTS slope profiles", and plots 1114, 1124, 1134 of the total heater power required for TD detection by the read spacing sensor (ECS) over a range of DHRs are referred to as "read spacing slope profiles" or "ECS slope profiles". As explained below, the difference in total heater power required to achieve write TD and read TD at a particular DHR is proportional to the write and read spacing loss or variation at that DHR.

The ECS and NTS slope profiles of FIGS. 11A-11C are merely a few examples of innumerable and unpredictable topography variations such as PTR that inherently occur from head-to-head in HDD manufacturing and may continue to occur or be exacerbated during HDD use. In some examples, to obtain ECS and NTS slope profiles such as those shown in FIGS. 11A-C, heater power is dithered as it is increased. TD power on the vertical axes refers to the total heater power that is applied to both heaters in combination, and DHR on the horizontal axes refers to the percentage of that total power that is apportioned to read heater TFC1. For instance, a DHR of 0 indicates that no power is applied to read heater TFC1, and thus also indicates that all power is applied to write heater TFC2. Likewise, a DHR of 100 indicates that all power is applied to read heater TFC1 and that no power is applied to write heater TFC2. A DHR of 25 indicates that 25% of the total power is applied to read heater TFC1 and that 75% of the total power is applied to write heater TFC2. And so on.

Referring to FIG. 11A, at a DHR of 0 (all power applied to write heater TFC2), NTS slope profile 1112 indicates that about 83 mW of total heater power is required for write TD, and ECS slope profile 1114 indicates that about 101 mW of total heater power is required for read TD. At a DHR of 100 (all power applied to read heater TFC1), ECS slope profile 1114 indicates that about 90 mW of total heater power is required for read TD, and NTS slope profile 1112 indicates that about 94 mW of total heater power is required for write TD. The total heater power required to achieve read TD and write TD varies between these extremes based on the DHR. At a DHR of about 55 and a total heater power of about 93 mW, which is the intersection of the ECS and NTS slope profiles, both read and write TD are simultaneously achieved.

According to aspects of this disclosure, the difference in total heater power required for write TD and for read TD at a particular DHR is proportional to the write and read spacing loss or variation at that DHR. In particular, a total heater power difference of about 10 mW is roughly proportional to a spacing loss or variation of about 1 nm. Referring again to FIG. 11A, the difference in total heater power between NTS slope profile 1112 and ECS slope profile 1114 at a DHR of 0 is about 18 mV, which indicates a read spacing loss or variation of about 1.8 nm. At a DHR of 100, the spacing between the ECS and NTS slope profiles is about 4 mV, which indicates a spacing loss or variation of about 0.4 nm. Importantly, at a DHR of about 55, there is no difference in total heater power required to achieve read TD and write TD, which equates to no read TD or write TD spacing loss or variation. Thus, according to aspects of this disclosure, by setting this particular head to have a DHR of 55, there will be minimal spacing variations or loss at either read or write TD.

In view of the above, according to aspects of this disclosure, head-to-head topography variations can be neutralized by DHR settings that are customized by head, such that ACC losses due to spacing variations at TD are minimized. According to aspects of this disclosure, the operating DHR of a head is optimized on a per-head basis by setting the operating DHR to be at the intersection of the ECS and NTS slope profiles. Stated another way, the DHR is set at the point where the total heater power required to achieve read TD and write TD is the same, which indicates that there is no or minimal spacing differences between the read and write elements at TD. In this manner, every head in a group of heads can be dialed in to have consistent read/write spacing behavior at TD, and read/write spacing loss due to PTR variations is minimized. TD detection is also improved, as choosing a DHR that yields no spacing loss between the read and write elements at TD effectively results in a bigger bulge profile for TD detection, as both the read and write heaters are engaged and push both the read and write elements closer to the disk surface. Additional advantages include improvement of TPTP-related clearance issues, improvement of radial/pitch related read/write spacing loss, and reduction of the test time required relative to other modes of operation such as DIH mode.

FIGS. 11A-11C show that, due to PTR and other topography variations from head-to-head, read and write spacing losses as well as the optimal DHR will vary from head-to-head. In graph 1120 of FIG. 11B, for example, the point of intersection of NTS slope profile 1122 and ECS slope profile 1124 indicates an optimal DHR for that head of about 65. In graph 1130 of FIG. 11C, the point of intersection of NTS slope profile 1132 and ECS slope profile 1134 indicates an optimal DHR for that head of about 48. By optimizing the operating DHR on a per-head basis in this manner, every head can be dialed in to have the same read/write spacing at TD, read/write spacing loss due to PTR variations and resultant ACC losses are reduced, and TD detection is improved. The per-head operating DHR may be further customized to account for isothermal protrusion effects caused by drive temperature fluctuation.

As described above, consistent performance free of substantial spacing variations at read TD and write TD for a group of heads may be obtained by setting the operating DHR for each head in correspondence with the intersection of the read and write spacing slope profiles for that head. There may be other instances, however, where some other bulge profile for a head is desired or needed. In such instances, the DHR for a head may be set to yield a desired bulge profile or to modify its current bulge profile by referencing the read and write spacing slope profiles for that head (such as shown in FIGS. 11A-11C) and selecting the DHR that is operative to achieve a desired read/write element spacing at TD.

Method 80 for compensating for PTR variations in a head configured with read and write heaters is illustrated in FIG. 2C. Method 80 may be performed, for example, by control circuitry 22. In some embodiments, control circuitry 22 may be implemented in the preamplifier of HDD 15. In step 82, a read spacing slope profile comprising read TDs over a range of DHRs is determined, such as by determining the total heater power required for read TD over the range of DHRs. In step 84, a write spacing slope profile comprising write TDs over the range of DHRs is determined, such as by determining the total heater power required for write TD over the range of DHRs. In step 86, an operating DHR of the head is set to be where the read spacing slope profile intersects the write spacing slope profile, which is where the total heater power required for read TD and for write TD is the same. Steps 82-86 may be repeated for all heads in a drive or in a zone so that each head has consistent and minimal spacing loss at TDD, thereby minimizing ACC loss.

As described above, read TD may be detected by a read spacing sensor such as an ECS, and write TD may be detected by a write spacing sensor such as an NTS. In some examples, the read spacing and write spacing slope profiles are concurrently determined. In some examples, the operating DHR of the head may be further optimized as a function of drive temperature. As noted above, read TD and write TD may be detected without physical contact of the head with the disk surface, such as during TDBO.

According to aspects of this disclosure, the write spacing and read spacing slope profiles are determined without effecting read TD and write TD over the entire range of DHRs. That is, the read spacing and write spacing slope profiles can be determined over a smaller subset of the total range of DHRs. For example, with reference to FIG. 11A, write spacing slope profile 1112 could be determined by extrapolating just the two TD power measurements at DHRs of about 0 and about 25, and read spacing slope profile 1114 could be determined by extrapolating just the two TD power measurements at DHRs of about 75 and about 100. In this manner, testing time and head component wear can be reduced.

The methods and flow diagrams disclosed herein are implemented by control circuitry 22, which may be implemented partially or wholly into an integrated circuit such as a system-on-a-chip, arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:
a disk;
a head comprising:
   a read element;
   a write element;
   a read heater configured to be powered based on a dual heater ratio (DHR) to thermally adjust a read spacing of the read element from a disk surface; and
   a write heater configured to be powered based on the DHR to thermally adjust a write spacing of the write element from the disk surface; and one or more processing devices, individually or in combination, configured to set an operating DHR of the head, the setting comprising:
   determine a read spacing slope profile comprising read touchdowns (TDs) over a range of DHRs;
   determine a write spacing slope profile comprising write TDs over the range of DHRs; and
   set an operating DHR of the head to be where the read spacing slope profile intersects the write spacing slope profile.

2. The data storage device of claim 1, wherein:
the head is a first head,
the data storage device further comprises a second head, and
the one or more processing devices are further configured to set an operating DHR for the second head.

3. The data storage device of claim 1, wherein
the disk comprises a plurality of zones,
the one or more processing devices are further configured to set an operating DHR for the head in a first zone and to set an operating DHR for the head in a second zone.

4. The data storage device of claim 1, further comprising a read spacing sensor that detects the read TDs and a write spacing sensor that detects the write TDs.

5. The data storage device of claim 4, wherein the read spacing sensor is an embedded contact sensor (ECS) and the write spacing sensor is a near-field temperature sensor (NTS).

6. The data storage device of claim 1, wherein the one or more processing devices are further configured to:
   determine a first heater power required for the read TDs over the range of DHRs;
   determine a second heater power required for the write TDs over the range of DHRs; and
   set the operating DHR of the head to be where the first heater power equals the second heater power.

7. The data storage device of claim 1, wherein the one or more processing devices are configured to concurrently determine the read spacing slope profile and the write spacing slope profile.

8. The data storage device of claim 1, wherein the one or more processing devices are configured to set the operating DHR of the head as a function of drive temperature.

9. The data storage device of claim 1, wherein the one or more processing devices are configured to detect the read TDs and the write TDs without physical contact of the head with the disk surface.

10. The data storage device of claim 9, wherein the one or more processing devices are configured to detect the read TDs and the write TDs during TD backoff (TDBO).

11. The data storage device of claim 1, wherein the one or more processing devices are configured to determine the write spacing slope profile and the read spacing slope profile over a subset of the range of DHRs.

12. A method for compensating for topography variations in a head comprising a read heater configured to be powered based on a dual heater ratio (DHR) to thermally adjust a read spacing of a read element from a disk surface, and a write heater configured to be powered based on the DHR to thermally adjust a write spacing of a write element from the disk surface, the method comprising:
   determining a read spacing slope profile comprising read touchdowns (TDs) over a range of DHRs;
   determining a write spacing slope profile comprising write TDs over the range of DHRs; and setting an operating DHR of the head to be where the read spacing slope profile intersects the write spacing slope profile.

13. The method of claim 12, further comprising detecting the read TDs by an embedded contact sensor (ECS) and detecting the write TDs by a near-field temperature sensor (NTS).

14. The method of claim 12, further comprising:
determining a first heater power required for the read TDs over the range of DHRs;
determining a second heater power required for the write TDs over the range of DHRs; and
setting the operating DHR of the head to be where the first heater power equals the second heater power.

15. The method of claim 12, further comprising detecting the read TDs and the write TDs without physical contact of the head with a disk surface.

16. The method of claim 15, further comprising detecting the read TDs and the write TDs during TD backoff (TDBO).

17. The method of claim 12, further comprising determining the write spacing slope profile and the read spacing slope profile over a subset of the range of DHRs.

18. One or more processing devices, individually or in combination, for controlling a head of a data storage device, the head comprising a read heater configured to be powered based on a dual heater ratio (DHR) to thermally adjust a read spacing of a read element from a disk surface, and a write heater configured to be powered based on the DHR to thermally adjust a write spacing of a write element from the disk surface, the one or more processing devices being configured to:
determine a first heater power required for read TDs over a range of DHRs;
determine a second heater power required for write TDs over the range of DHRs; and
set an operating DHR of the head to be where the first heater power equals the second heater power.

19. The one or more processing devices of claim 18, wherein the read TDs are detected by an embedded contact sensor (ECS) and the write TDs are detected by a near-field temperature sensor (NTS).

20. The one or more processing devices of claim 18, wherein the one or more processing devices are configured to:
determine a read spacing slope profile comprising the read TDs over the range of DHRs;
determine a write spacing slope profile comprising the write TDs over the range of DHRs; and
set the operating DHR of the head to be where the read spacing slope profile intersects the write spacing slope profile.

21. The one or more processing devices of claim 18, wherein the one or more processing devices are configured to detect the read TDs and the write TDs during TD backoff (TDBO) without physical contact of the head with the disk surface.

22. The one or more processing devices of claim 18, further comprising determining the first heater power and the second heater power over a subset of the range of DHRs.

23. The one or more processing devices of claim 18, wherein:
the head is a first head,
the data storage device further comprises a second head, and
the one or more processing devices are further configured to set an operating DHR for the second head.

24. The one or more processing devices of claim 18, wherein:
the disk surface comprises a plurality of zones and the one or more processing devices are further configured to set an operating DHR for the head in a first zone and to set an operating DHR for the head in a second zone.

* * * * *